S. L. CASELLA.
MACHINE FOR MAKING BATTERY ELECTRODES.
APPLICATION FILED DEC. 7, 1916.
1,291,400.
Patented Jan. 14, 1919.
12 SHEETS—SHEET 1.
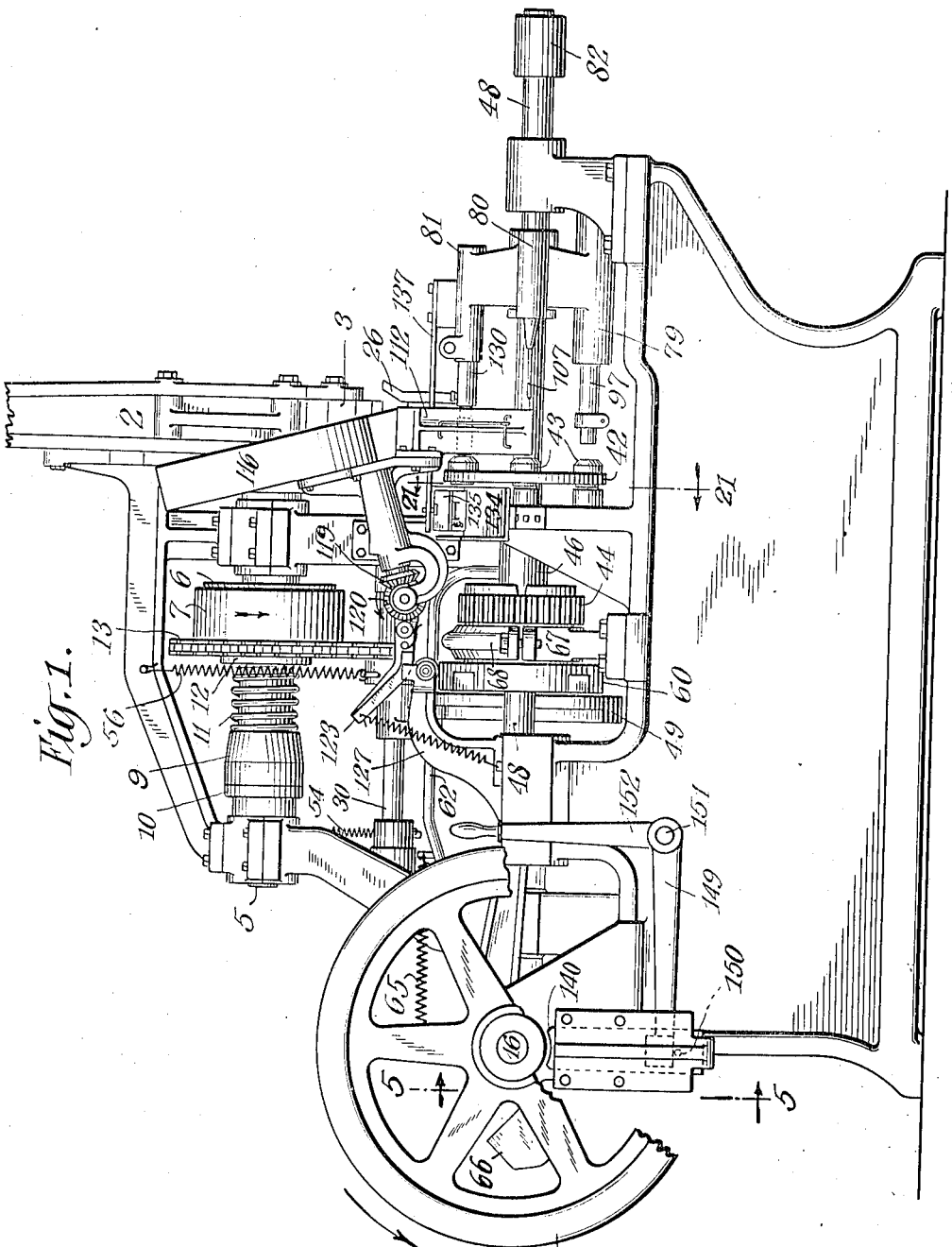
INVENTOR
Secondo L. Casella
BY
Henry D. Williams
ATTORNEY S. L. CASELLA.
MACHINE FOR MAKING BATTERY ELECTRODES.
APPLICATION FILED DEC. 7, 1916.
1,291,400.
Patented Jan. 14, 1919.
12 SHEETS—SHEET 2.
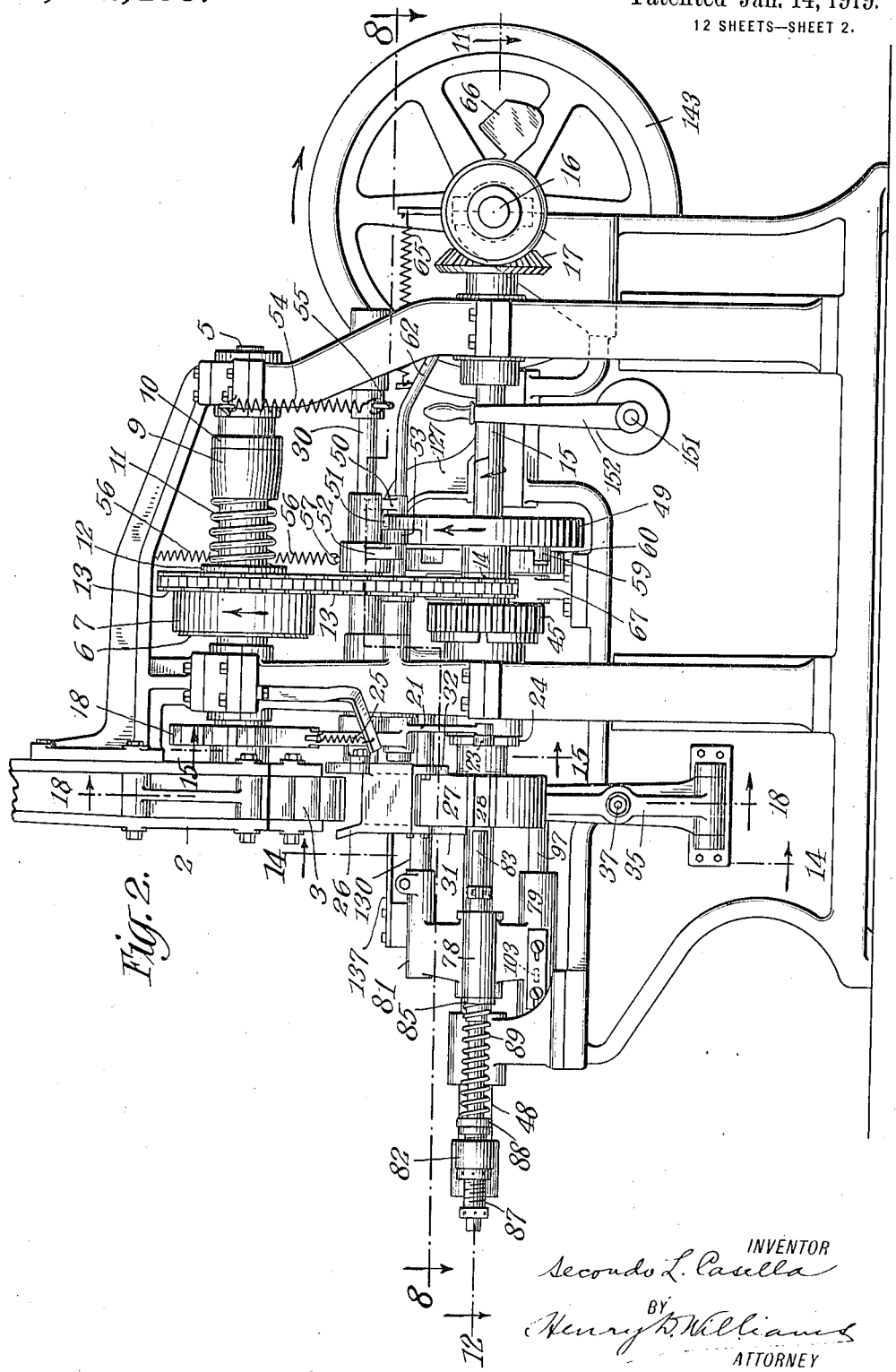
INVENTOR
Secondo L. Casella
BY
Henry D. Williams
ATTORNEY

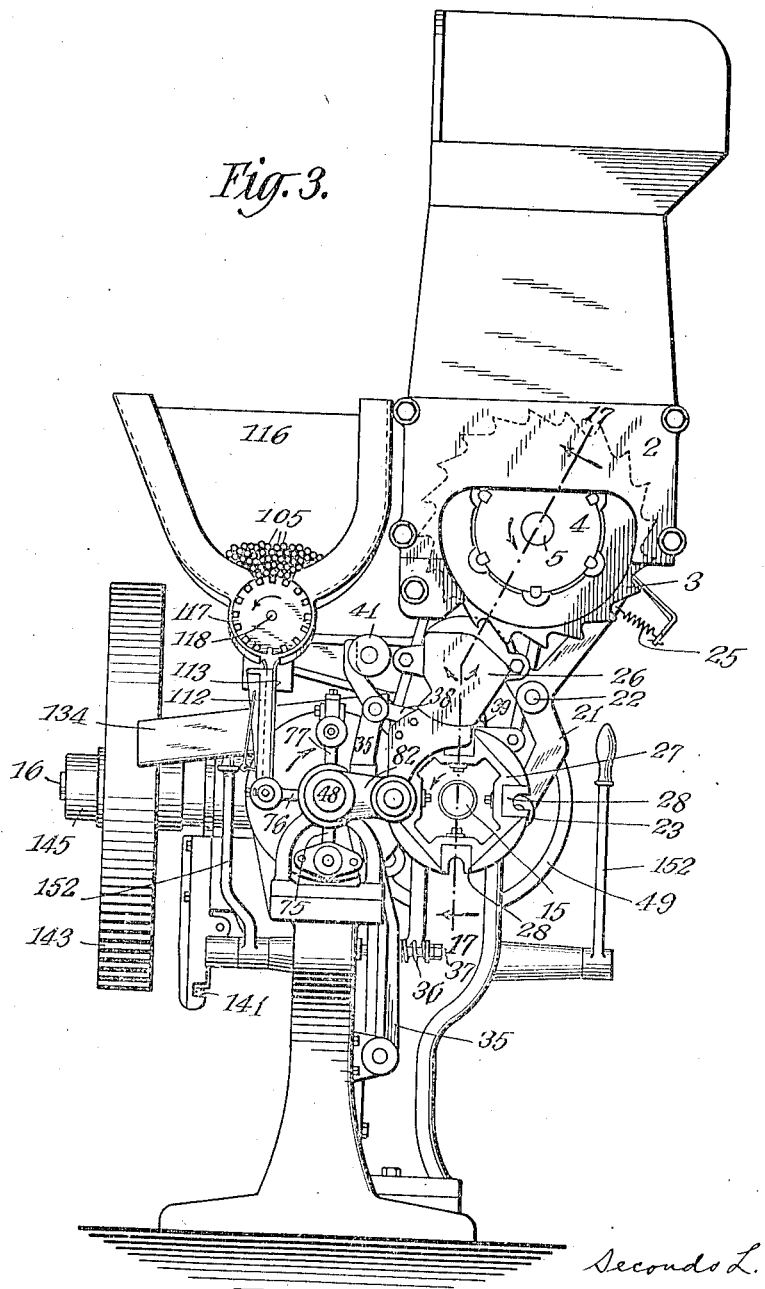

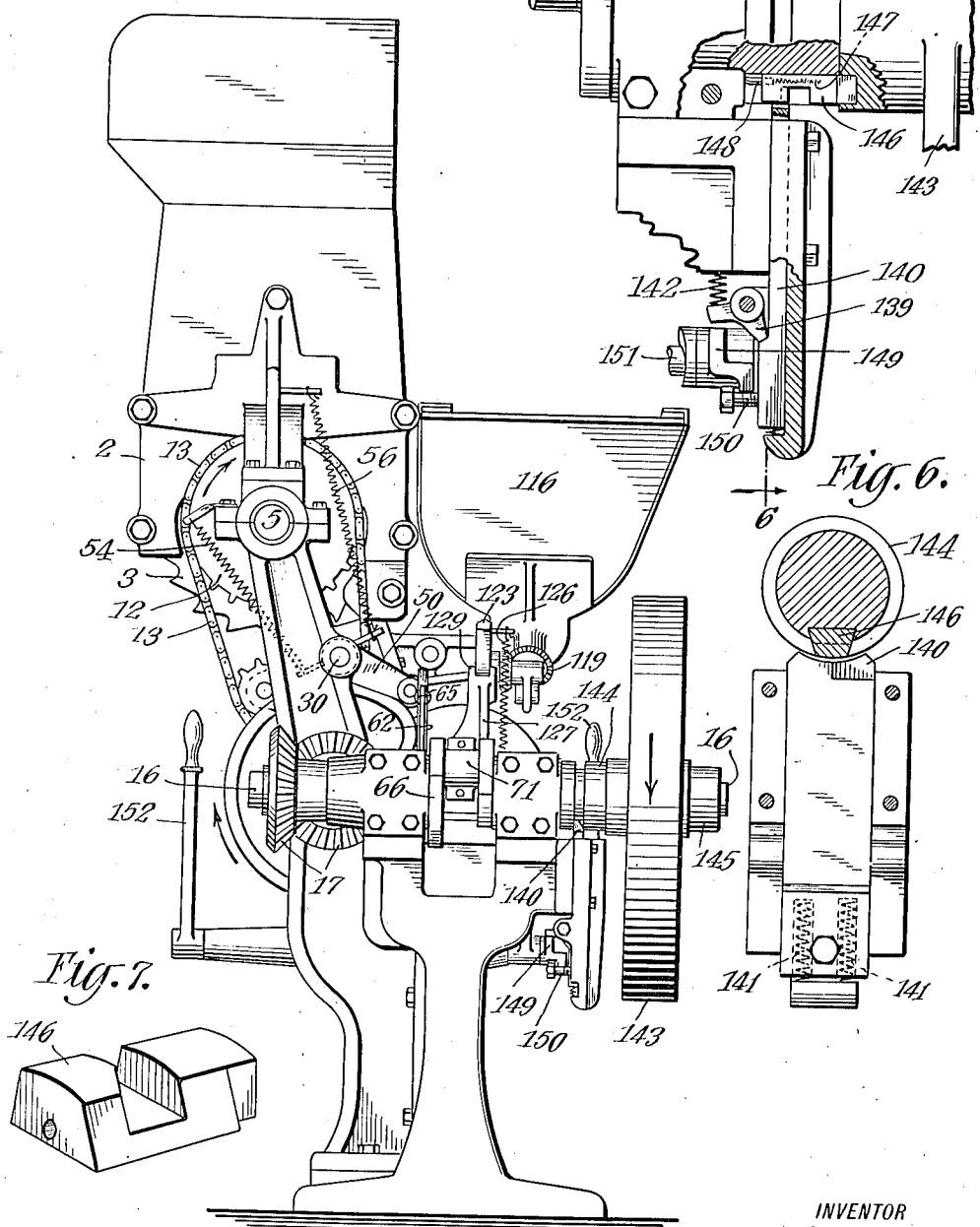

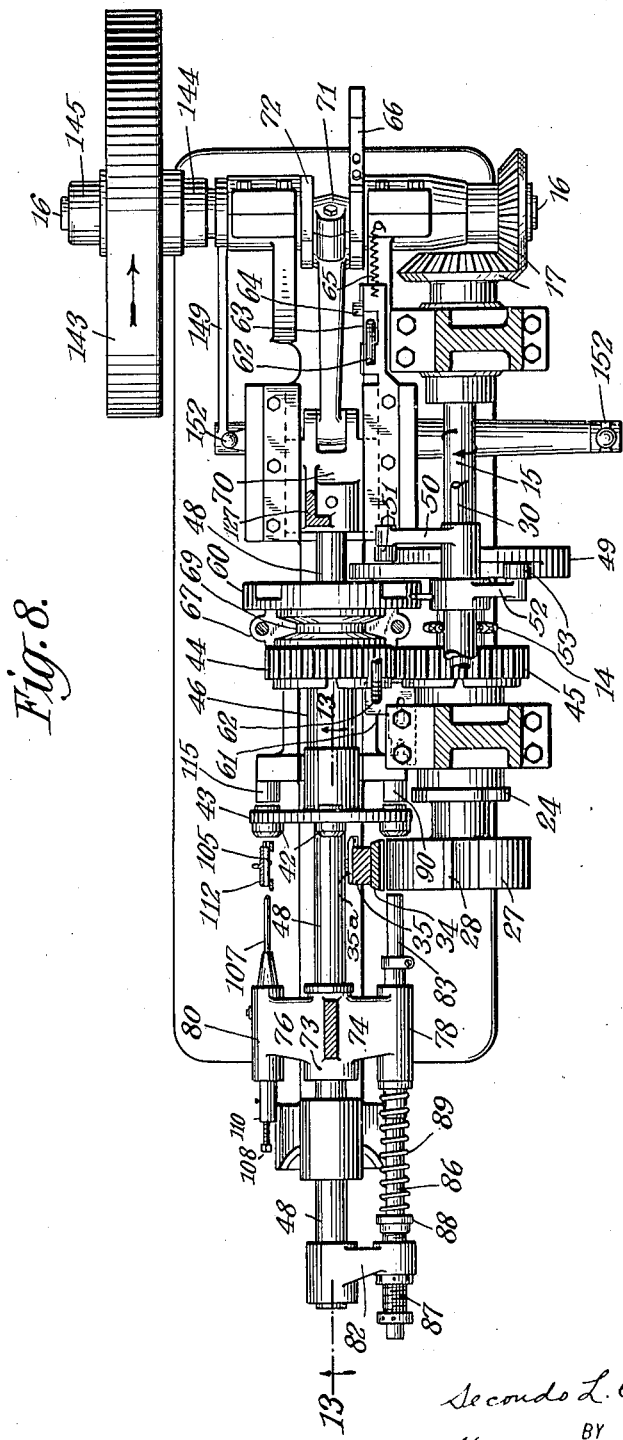

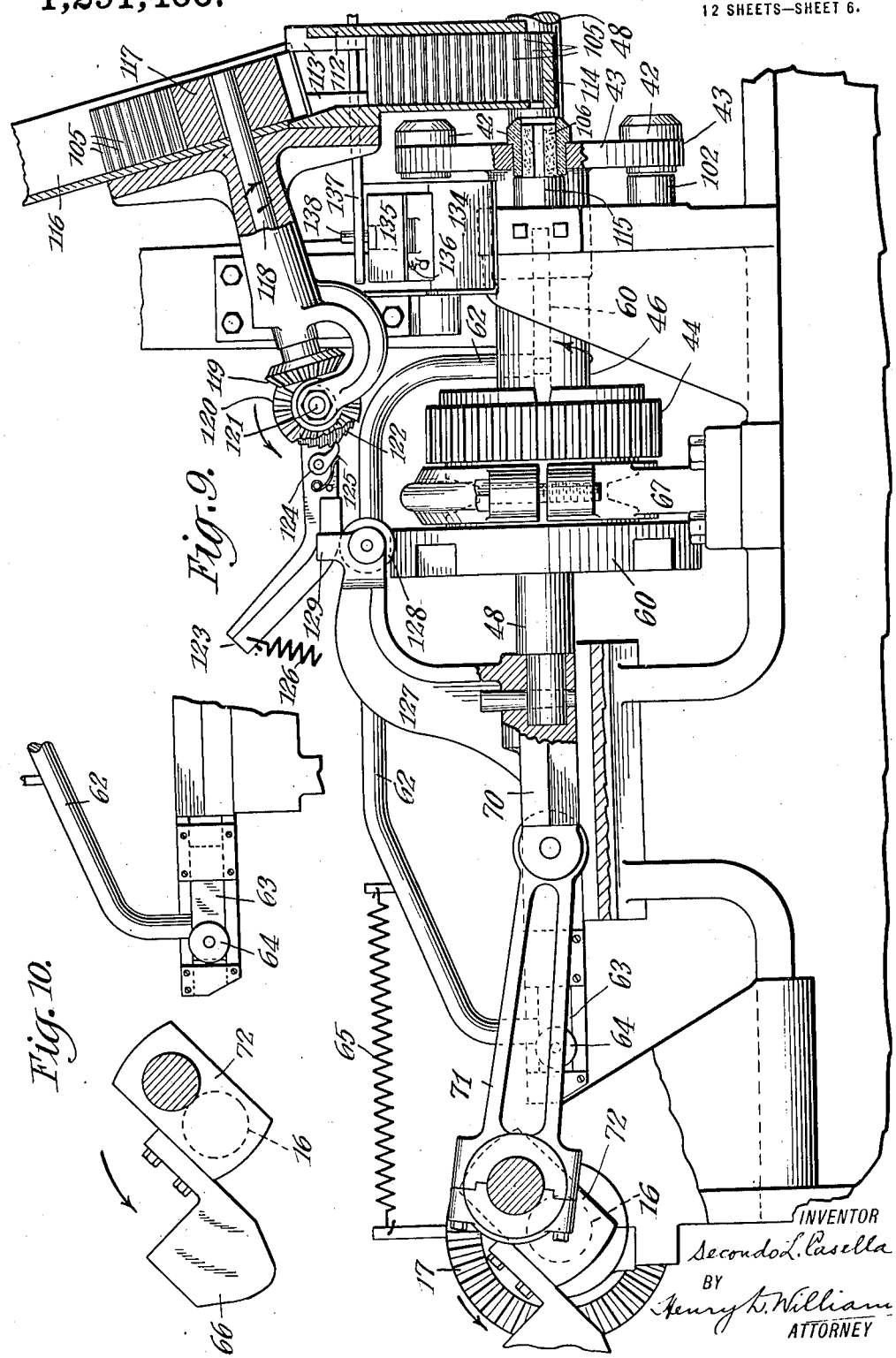

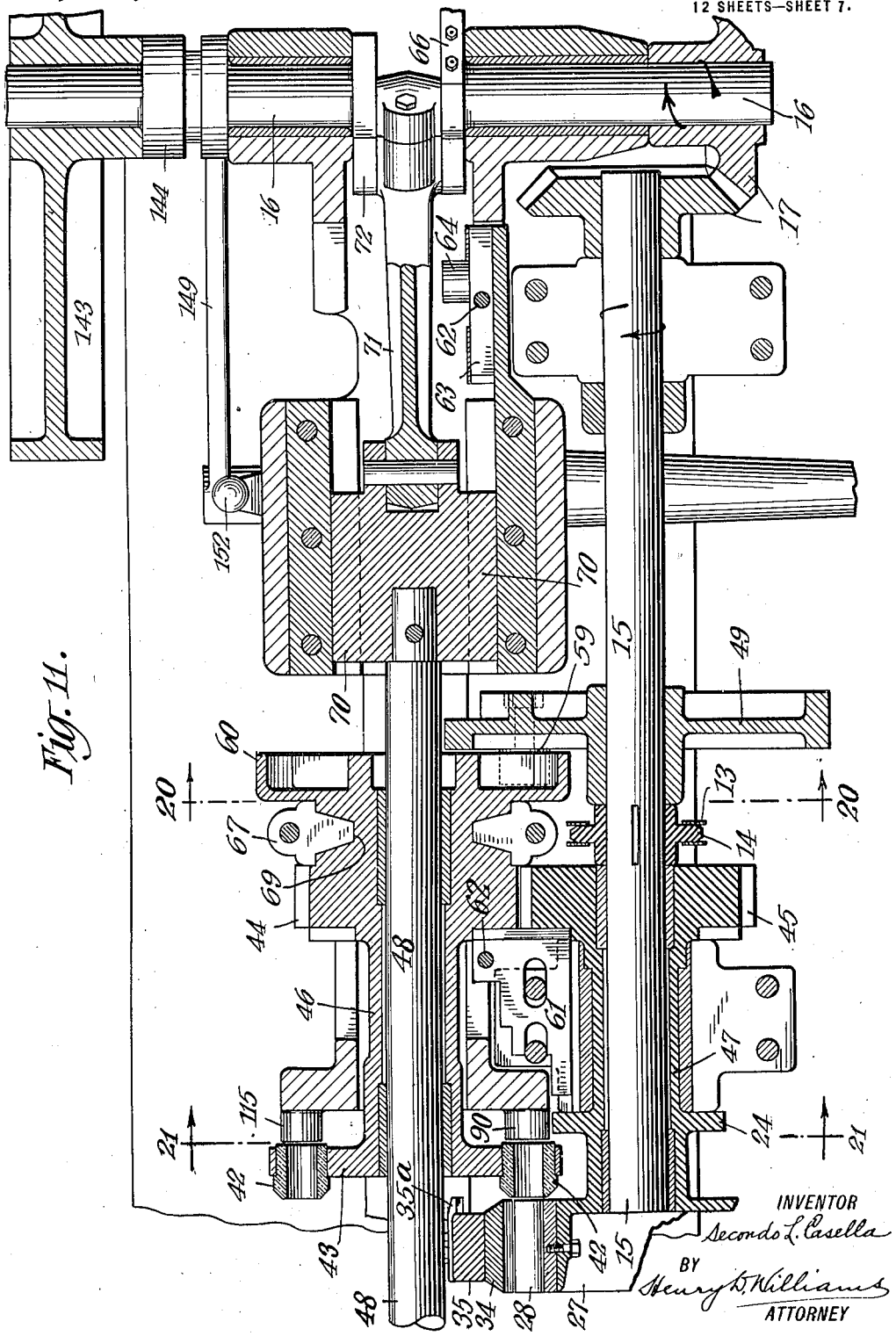

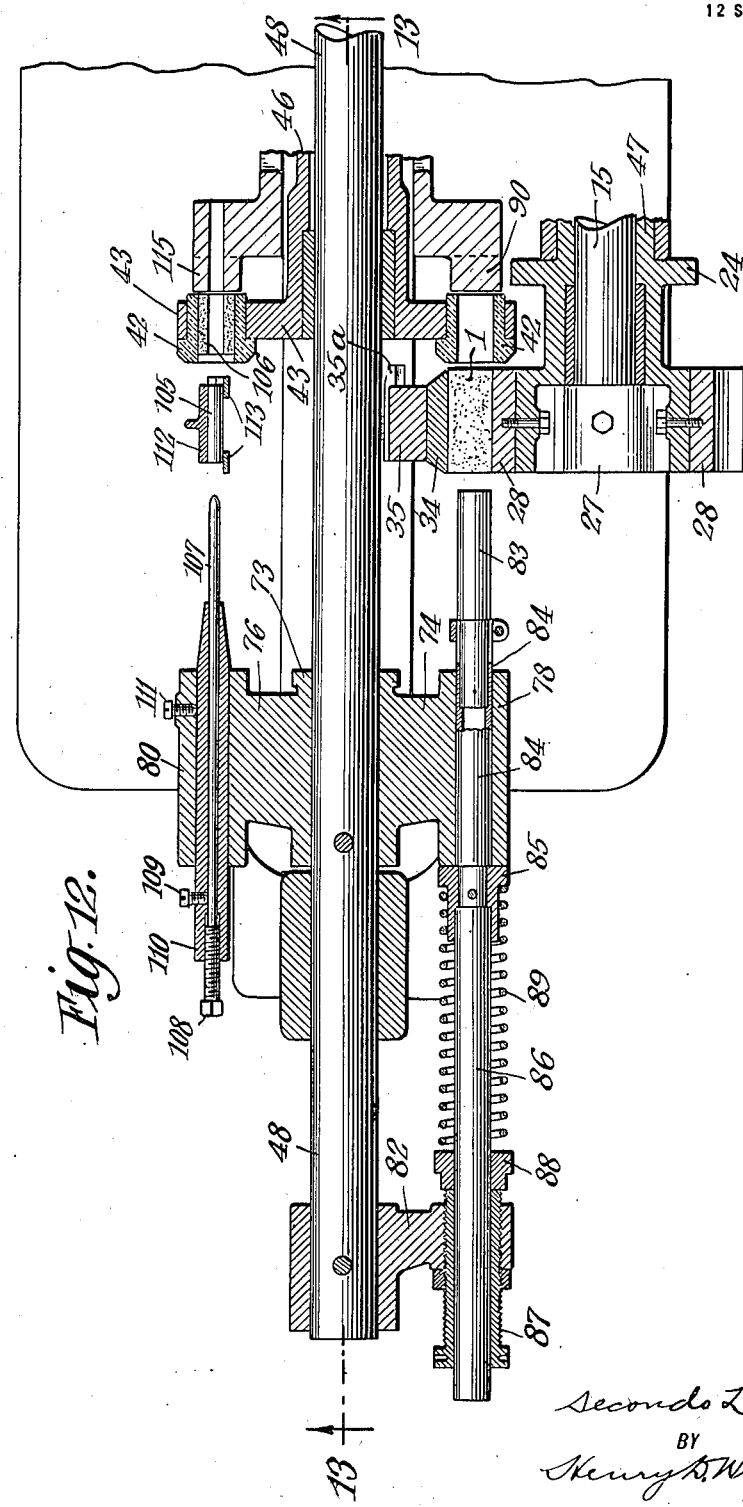

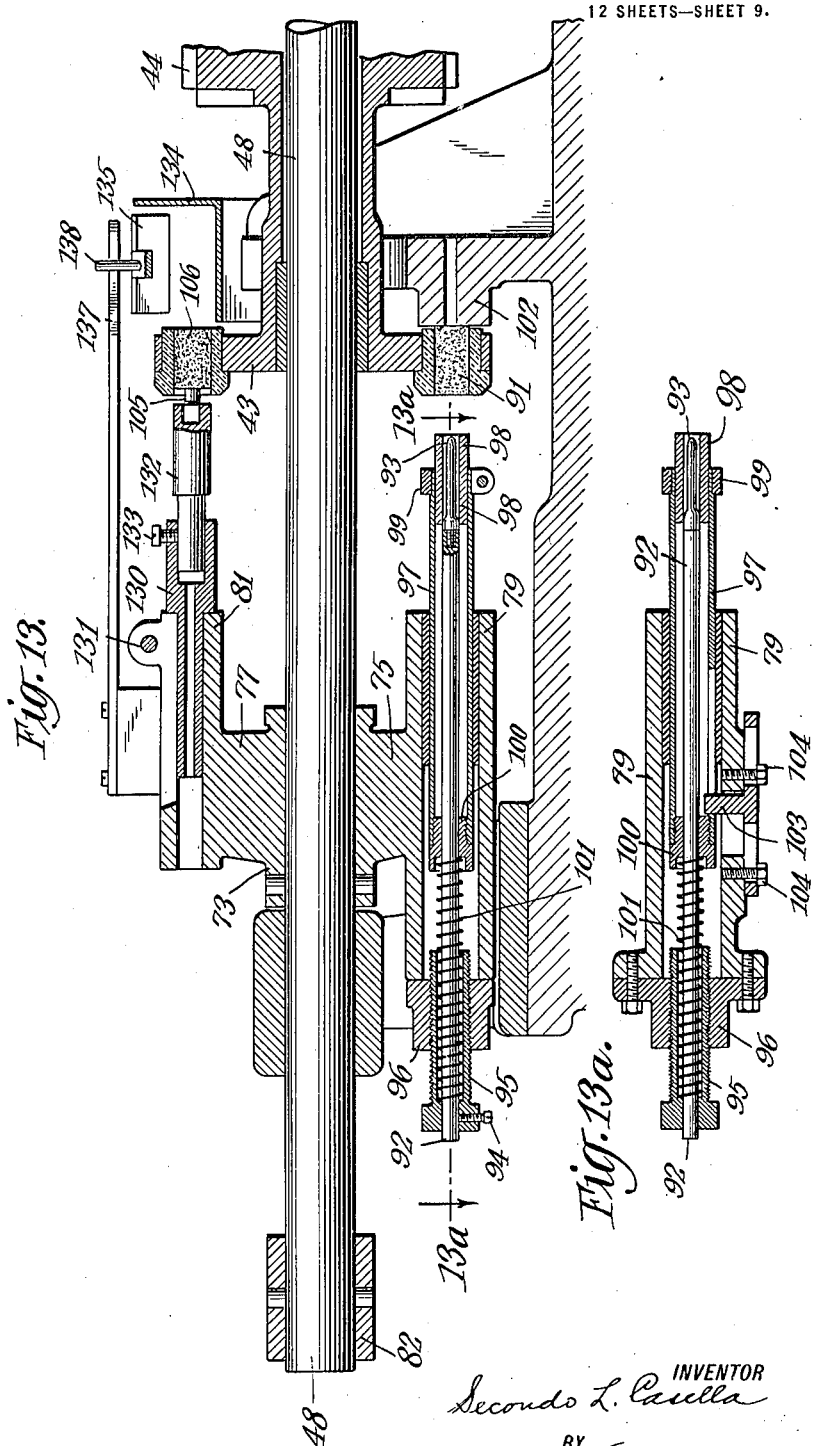

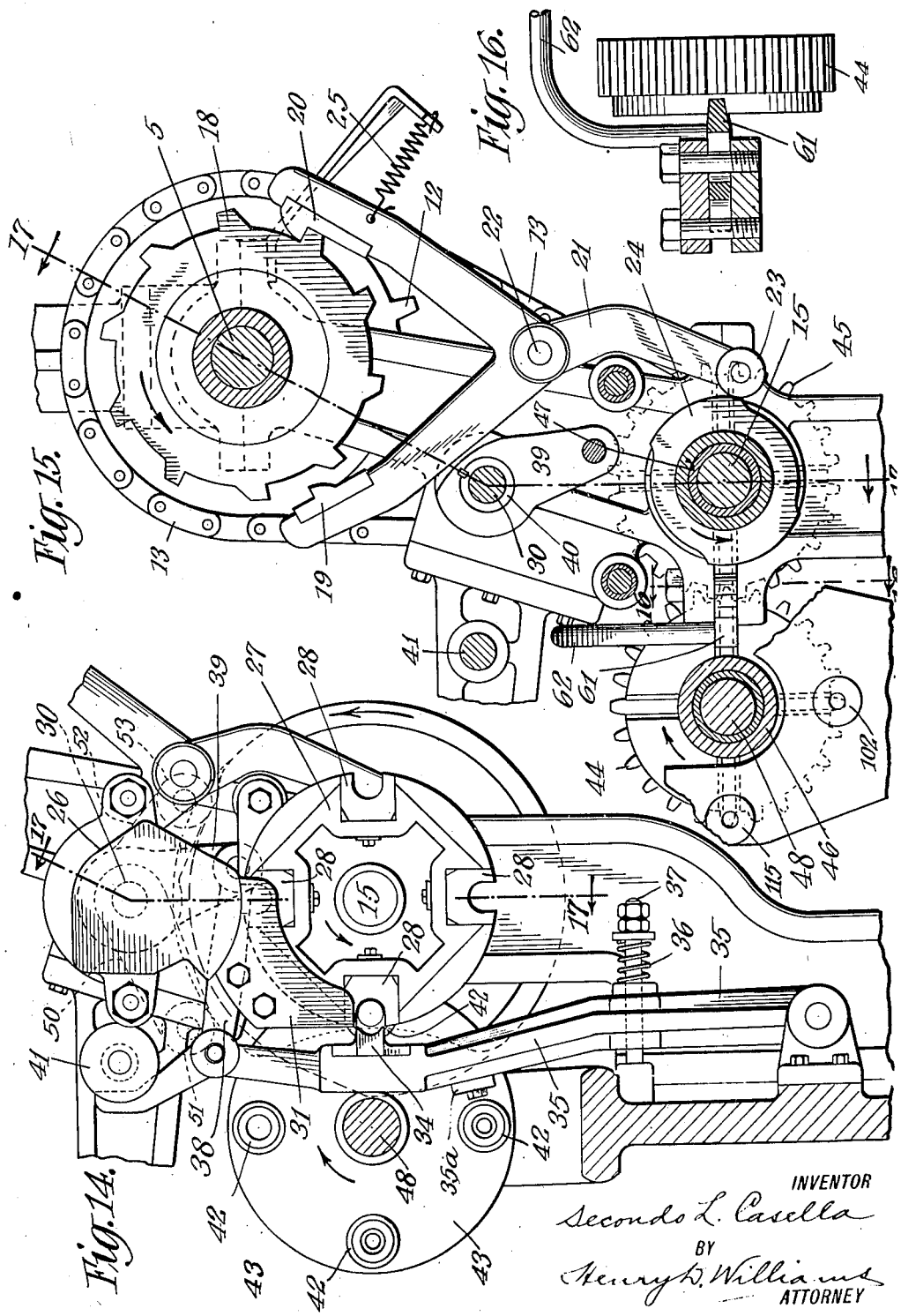

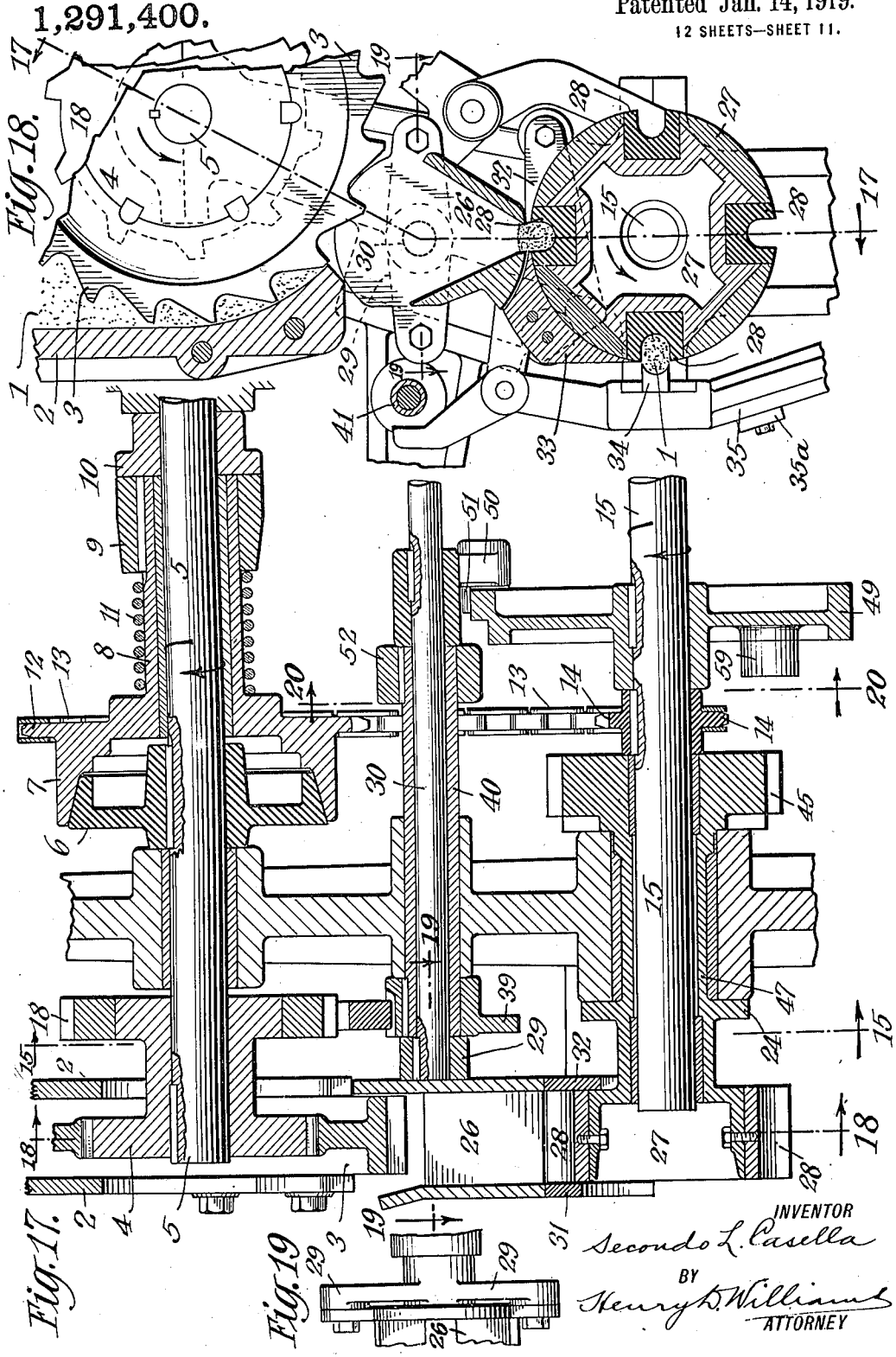

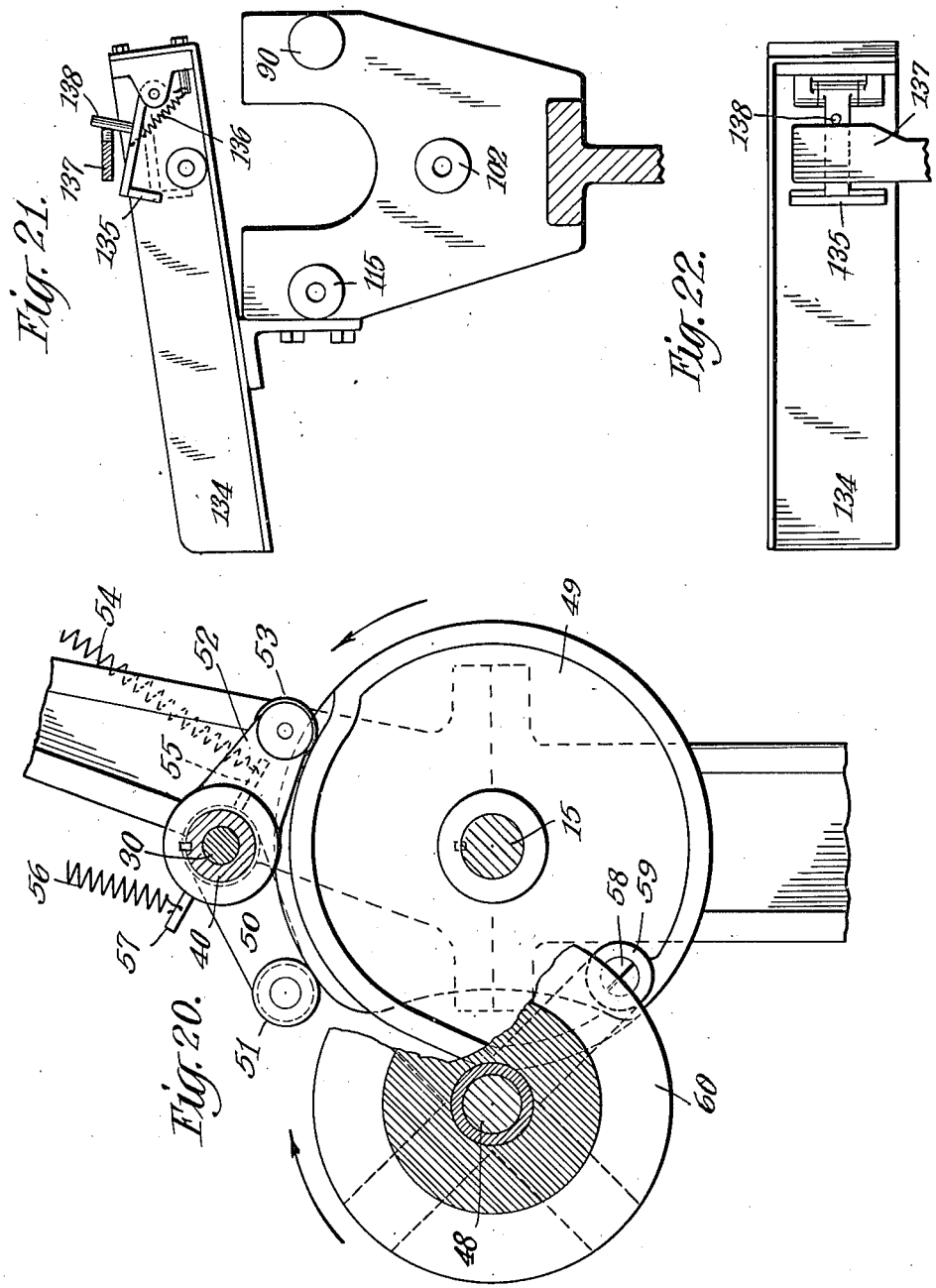

UNITED STATES PATENT OFFICE.

SECONDO LOUIS CASELLA, OF NEW YORK, N. Y., ASSIGNOR, BY MESNE ASSIGNMENTS, TO NATIONAL CARBON COMPANY, INC., OF LONG ISLAND CITY, NEW YORK, A CORPORATION OF NEW YORK.

MACHINE FOR MAKING BATTERY-ELECTRODES.

1,291,400.  Specification of Letters Patent.  Patented Jan. 14, 1919.

Application filed December 7, 1916. Serial No. 135,553.

*To all whom it may concern:*

Be it known that I, SECONDO L. CASELLA, a citizen of the United States, residing at the borough of Manhattan, in the county of New York and State of New York, have invented certain new and useful Improvements in Machines for Making Battery-Electrodes, of which the following is a specification, reference being had therein to the accompanying drawings, forming part thereof.

My invention relates to machines for automatically making the inner electrode or bobbin of usual dry batteries. Such electrode or bobbin commonly includes a cylindrical mass of depolarizing material which surrounds a central electrode rod of carbon. The machine of my present invention is a further development of and improvement upon that covered by my Patent No. 1,185,177 of May 30, 1916, for electrode-making machines. The above noted patent, as will be found by an examination thereof, is for a machine which is only partly automatic in its operation, some of the operations, notably that of feeding the depolarizing material to the molds, as well as the step by step rotation of the mold-carrying turret, being performed manually, whereas in the machine of my present invention all of the electrode-making operations are performed automatically by the machine itself.

One of the important objects of my invention is to obtain uniformity in the finished product or electrode bobbins, particularly as to the quantity and uniformity of arrangement of the depolarizing mass around the carbon electrode rod, this having been found in practice to be very difficult and substantially unattainable when such material is fed to the molds by hand. Another object of my invention is economy of production of the electrodes: that is, to increase the output of each machine to such an extent that the total cost of manufacture of a given number of electrode bobbins will be reduced, as determined among other things by the cost of the machines, by the less total floor space occupied thereby, and by the lesser number of operators required. Other objects of my invention are to produce a machine for this purpose which is strong, durable, efficient, dependable, convenient, comparatively simple in construction and inexpensive of manufacture. Other objects and advantages of my invention will hereinafter appear.

My invention includes features of construction and combinations of parts and sub-combinations thereof as will appear from the following description.

I shall now describe the electrode-making machine or bobbin machine embodying my invention illustrated in the accompanying drawings and shall thereafter point out my invention in claims.

Figure 1 is an elevation of a complete electrode-making machine or bobbin machine as viewed from the front or delivery side thereof with a part of the main drive pulley and the upper part of the powder magazine omitted or broken away.

Fig. 2 is a similar elevation of the other side or rear of the machine.

Fig. 3 is a complete elevation of the front end or feed end of the machine as viewed from the right in Fig. 1 and from the left in Fig. 2.

Fig. 4 is a similar elevation of the rear or drive end of the machine as viewed from the left in Fig. 1 and from the right in Fig. 2.

Fig. 5 is a partial enlarged vertical section on a plane indicated by the line 5—5 of Fig. 1 as viewed from the left, showing the driving clutch and its operating means.

Fig. 6 is a vertical section on a plane indicated by the line 6—6 of Fig. 5 as viewed from the left, the clutch being shown in Figs. 5 and 6 as engaged, for driving the machine.

Fig. 7 is a further enlarged perspective view of a clutch member or clutch bolt which is carried by the main drive shaft and which appears in Figs. 5 and 6.

Fig. 8 is a horizontal section of the complete machine on planes indicated by the staggered line 8—8 of Fig. 2 as viewed from above.

Fig. 9 is an enlarged front side elevation of the rear end or drive end of the machine as it appears in Fig. 1, partly in section and with parts omitted and broken away.

Fig. 10 is a side elevation of the releasing device for the turret lock as it appears in Fig. 9, with parts omitted.

Fig. 11 is an enlarged horizontal section of the rear or drive end of the machine ap pearing at the right in Fig. 2, the section being taken on a plane indicated by the line 12—11 of Fig. 2 as viewed from above.

Fig. 12 is a similar section of the front or feed end of the machine appearing at the left in Fig. 2, with parts omitted.

Fig. 13 is a similarly enlarged vertical longitudinal section of the front end of the machine on a plane indicated by the line 13—13 of Figs. 8 and 12.

Fig. 13ᵃ is a horizontal section on a plane indicated by the line 13ᵃ—13ᵃ of Fig. 13.

Fig. 14 is a slightly less enlarged partial transverse vertical section of the machine on a plane indicated by the line 14—14 of Fig. 2 as viewed from the left.

Fig. 15 is a similar section on a plane indicated by the line 15—15 of Figs. 2 and 17.

Fig. 16 is a partial vertical longitudinal section on a plane indicated by the line 16—16 of Fig. 15 as viewed from the right.

Fig. 17 is a partial longitudinal section of the machine on planes indicated by the bent line 17—17 of Figs. 3, 14, 15 and 18 as viewed from the right.

Fig. 18 is a partial transverse vertical section on a plane indicated by the line 18—18 of Figs. 2 and 17 as viewed from the left.

Fig. 19 is a partial horizontal section, with the parts appearing in plan, on a plane indicated by the line 19—19 of Figs. 17 and 18.

Fig. 20 is an enlarged partial transverse vertical section of the machine on a plane indicated by the line 20—20 of Figs. 11 and 17 as viewed from the left.

Fig. 21 is a similar section on a plane indicated by the line 21—21 of Fig. 1 as viewed from the right and of Fig. 11 as viewed from the left, and shows the delivery chute for the completed electrode bobbin and its controlling gate.

Fig. 22 is a plan of what appears in Fig. 21.

In the electrode-making or bobbin machine embodying my invention illustrated in the accompanying drawings the depolarizing material 1 (Fig. 18) is supplied to and contained in an open top receptacle or powder magazine 2. This depolarizing material is commonly in the form of a fine dark brown or nearly black, slightly moist powder, which is commonly a manganese compound, such as a hydroxid of manganese, this powdered depolarizing material being of such a consistency or nature that it may be compressed into solid cylindrical blocks for forming a part of the positive electrode or bobbin, these compressed cylinders being friable but having a fair degree of hardness which will permit of their being handled or manipulated to the required extent in the subsequent operation of assembling or constructing the complete dry battery. In this connection it is to be noted that the power magazine 2 spreads or flares downwardly as to each of its four walls so that the slightly moist powdered depolarizing material as it is used from the bottom of the magazine 2 will drop or settle downward therein without sticking or clogging in the magazine. The bottom of the powder magazine 2 is closed by a toothed or peripherally notched feed wheel 3, the peripheral feed teeth of the feed wheel 3 in the machine illustrated in the drawings being twenty in number and providing a corresponding number of charge-receiving pockets between such teeth, the forward faces of these teeth being shown as radial and the rear faces as inclined, the rear and forward faces of successive adjacent teeth being joined by a substantially circular curve, as appears in the drawings, particularly in Figs. 3 and 18. It will be apparent, particularly from an inspection of Figs. 3 and 18, that as the feed wheel 3 rotates in a counter-clockwise direction as viewed in these figures, the powdered depolarizing material 1 contained in the powder magazine 2 will be collected in the charge-receiving notches or pockets formed by the teeth of the feed wheel 3, and will be slightly compressed in such pockets by the rotation of the wheel and against the adjacent conforming wall of the powder magazine 2 and will be permitted to drop downward from the feed wheel 3 as the successive teeth thereof escape from the lower edge or end of the adjacent wall of the powder magazine 2, as clearly appears in Fig. 18, it being noted that the shape of the feed wheel teeth and the conformation of the charge-receiving pockets formed between them are such as to facilitate this collection, slight compression and ready discharge of the charges of powdered depolarizing material. This arrangement assures the delivering of substantially uniform charges by the feed wheel 3 from the magazine 2.

Means are provided for imparting step by step powder-feeding rotation to the feed wheel 3, such operating means including means for imparting a powder-releasing jolt or jar to the feed wheel 3 at the completion of each movement in its intermittent step by step rotation, so as to assure that the slightly damp powder shall not stick or adhere to the face of the feed wheel in the charge-receiving notches thereof, and such operating means for the feed wheel 3 will now be described. The feed wheel 3 is shown as carried by a feed wheel hub 4 which is fixed upon the projecting forward end of a feed wheel shaft 5 which extends longitudinally of the machine and is journaled in bearings in the upper part of the frame thereof, as appears in the drawings. During the operation of the machine the feed wheel shaft 5 has a continuous torque applied thereto by driving means including a friction clutch, shown as a cone clutch having the cone member 6 thereof fixed upon the feed wheel shaft 5 and engaged by the outer clutch member or cup member 7 which is mounted to rotate loosely upon and also to slide longitudinally upon the feed wheel shaft 5, as more particularly appears in Fig. 17 of the drawings. The cup or outer clutch member is provided with a bearing sleeve 8 shown as formed integral therewith and upon the outer or rear end thereof an abutment collar 9 is splined, as appears in Fig. 17, so as to rotate with the sleeve 8 while permitting relative longitudinal movement between the sleeve 8 and the abutment collar 9. A thrust collar 10 is shown as loosely mounted upon the feed wheel shaft 5 and is interposed between the abutment collar 9 and a part of the frame of the machine in which the feed wheel shaft 5 is journaled, as appears in Figs. 1, 2 and 17 of the drawings. A clutch-engaging coiled thrust spring 11 surrounds the sleeve 8 between the outer clutch member 7 and the abutment collar 9 and continuously presses the outer clutch member or cup 7 into frictional engagement with the inner clutch member or cone 6. During the operation of the machine the outer clutch member 7 is continuously rotated by means of a sprocket wheel 12 shown as formed thereon integral therewith and a sprocket chain 13 by which the sprocket wheel 12 is driven from a sprocket pinion or driving sprocket 14 which is fixed upon a longitudinal drive shaft 15 journaled in the frame of the machine and located below and somewhat to the left of the feed wheel shaft 5 as viewed from the front or feed end of the machine as seen in Fig. 3 of the drawings. During the operation of the machine continuous rotation is imparted to the longitudinal shaft 15 by means of a continuously rotated main drive shaft 16 which is journaled in and extends transversely of the frame of the machine at the rear or drive end thereof and which at the rear of the machine is connected to the longitudinal shaft 15 to drive the latter at the same speed by means of a pair of similar bevel gears 17.

The frictional engagement of the clutch members 6 and 7 of the cone clutch is sufficient to rotate the feed wheel 3 against the resistance of the powdered depolarizing material 1 contained in the powder magazine 2 when such rotation of the feed wheel 3 is permitted, but a detent device or escapement mechanism is provided which periodically arrests the rotation of the feed wheel 3 and which permits it to rotate only intermittently as desired for the successive feeding of the charges of depolarizing material from the powder magazine 2 at the proper times in the operation of the machine. An escapement ring or escapement wheel 18 is fixed upon the hub 4 of the feed wheel 3 at the rear thereof, at the outside and at the rear of the powder magazine 2, as appears in Fig. 17, and the escapement wheel 18 is provided with peripheral teeth to the number of ten, this being half the number of the twenty peripheral powder-feeding teeth of the feed wheel 3 and as appears in Fig. 15. Escapement stops 19 and 20 are carried by the divergent upper ends of a forked Y-shaped escapement lever 21 which, by means of a pivot stud 22, is pivoted upon the frame of the machine substantially at the junction point of its three divergent arms or branches.

The lower end of the lower branch or arm of the three-armed escapement lever 21 carries an anti-friction roller or cam roller 23 which is engaged by a rotative feed wheel escapement cam 24. The escapement cam 24 is provided, as appears most clearly in Fig. 15, with two oppositely arranged raised concentric cam faces and with two oppositely arranged depressed concentric cam faces, forming alternately arranged raised and depressed peripheral cam faces of a length adapted to actuate the cam roller 23 and its escapement lever 21 at each quarter rotation of the escapement cam 24. The escapement lever 21 is rocked in one direction of its movement, which is in a counter-clockwise direction as viewed in Figs. 3 and 15, by the concentric raised cam surfaces of the escapement cam 24 and is rocked in the other or clockwise direction of its movement by means of a retractile spring 25, as appears in Figs. 2, 3 and 15 of the drawings. The operating means for the escapement cam 24 will be hereinafter described in connection with other features of the machine with which this cam is associated or related.

When a tooth of the escapement wheel 18 is released by one of the detents or stops 19 or 20 the escapement wheel 18 together with the notched feed wheel 3 will have rotation imparted thereto and will be rotated by the torque impulse which is continuously impressed upon the feed wheel shaft 5 by the cone clutch, as hereinbefore described, and such rotation will be suddenly arrested by another tooth of the escapement wheel 18 impinging against or coming into contact with the other escapement stop 19 or 20 as the case may be. It will be noted that this sudden stoppage of the feed wheel 3 will impart thereto a jolt or jar which will shake loose or dislodge the charge of depolarizing material 1, which is delivered downward from the powder magazine 2, and will assure that it does not adhere to the feed wheel 3. Also it is to be noted that this jolt or jar, assisted by the general vibration of the machine, will be of distinct assistance in helping to fill the charge-receiving pockets in the upper part of the feed wheel 3 as it rotates in the powdered depolarizing material 1 in the lower part of the powder magazine 2 and will cause such powder 1 to settle into such pockets with a substantial uniformity.

The successive intermittently delivered charges of depolarizing material drop from the under side of the feed wheel 3 through a funnel-shaped guide hopper 26 upon the top of and into the peripheral notches of a peripherally notched feed turret 27 in which the charge-receiving notches are provided by means of open-sided forming molds or half molds 28 shown as four in number and as having circular bottoms and tangential sides parallel to each other, these molds opening radially outward of the feed turret 27. The intermittently rotated feed turret 27 in its periods of rest is arranged to stop with one of the radially open-sided molds or half molds 28 at the top thereof as appears in the drawings, particularly in Figs. 3, 14 and 18 thereof, and the charge of depolarizing material, delivered at the proper time by the feed wheel 3, drops downward from the feed wheel through the hopper 26 directly into the waiting half mold 28 at the top of the feed turret 27, it being noted that the notched feed wheel 3 delivers a charge, the quantity of which is slightly in excess of that required to fill the open-sided mold or half mold 28. The acquired momentum of the charge as it drops by gravity from the feed wheel 3 into the half mold 28 causes the depolarizing material to fill the half mold completely and uniformly and leaves the excess material projecting above the half mold into the lower part of the hopper 26, as is indicated in Fig. 18.

At the proper time after the dropping of the charge into the half mold 28, the hopper 26, which is carried by a hopper support 29 fixed upon the outer end of a rock shaft 30 extending longitudinally of the machine and having bearings in the frame thereof, is caused to rock in a counter-clockwise direction from the position of this hopper 26 appearing in the drawings, of which see particularly Figs. 3, 14 and 18, and removes or scrapes away the excess of depolarizing material from the top of the feed turret 27, throwing this slight excess material out at the rear of the machine. This arrangement assures that the open-sided molds or half molds 28 will be filled and that they will contain substantially the same amount of depolarizing material for each charge. The feed turret 27 is provided at the left and top thereof, as viewed from the front end of the machine and as appears in Figs. 3, 14, 17 and 18 of the drawings, with a front guard 31, a rear guard 32 and a top guard 33, for retaining the charges of depolarizing material 1 in the half molds 28 during the intermittent counter-clockwise rotation of the feed turret 27, this intermittent or step by step rotation being a quarter turn, corresponding to the four equidistantly circumferentially spaced half molds 28 carried by the feed turret 27. The means for rocking the guide hopper 26 and for imparting intermittent step by step rotation to the feed turret 27 will be presently described.

At the first period of rest of the feed turret 27 after an uppermost half mold 28 has received a charge of depolarizing material 1 as above described, this charge is compressed into the forming mold or half mold 28, which is then horizontally at the left of the feed turret 27, as appears in Figs. 14 and 18 of the drawings, by means of a second forming mold or former 34 which fits into the half mold 28 and which has a circularly curved compressing face corresponding to the circular curve of the bottom of the half mold 28, as clearly appears in Figs. 14 and 18, the charge of depolarizing material being shaped to cylindrical form between the open-sided forming mold 28 and the former 34. The former 34 is carried by a substantially vertically arranged lever or forming arm 35 which is pivoted at its lower end to the frame of the machine, as appears in the drawings. The forming arm 35 is retracted to withdraw the former 34 from the half mold 28 by means of a coiled compression spring 36 on a stud or bolt 37 carried by the frame of the machine, as appears in the drawings. In its forming or molding operation the forming arm 35 is actuated by means of a link 38 and rocking arm 39 carried by a sleeve 40 which is journaled in the frame of the machine and surrounds the rock shaft 30 for the hopper 26 and the operating means for which will be presently described. In order to assure that the former 34 shall always be brought exactly to the correct position for forming the charge in the half mold 28 into correct cylindrical shape, a positive stop 41 is provided for the upper end of the forming arm 35 against which this arm is firmly pulled by its operating means at each molding or forming operation, so that the effect of any wear or lost motion in the connecting parts is nullified. Also in this connection it is to be noted that the stop 41 is provided with front and rear flanges which act as lateral guides for the upper end of the forming arm 35, thereby keeping the former 34 in correct alinement with the half mold 28 with which it cooperates.

At the point or place where the depolarizing material 1 in the half mold 28 is formed into a cylinder by the former 34, this cylinder of depolarizing material is brought by the feed turret 27 into alinement with and at the front of one of a circular series or plurality of interiorly cylindrical open-ended compression molds 42, shown as four in number equidistantly circumferentially spaced upon and carried by a mold turret 43, parallel to the axis thereof. The mold turret 43 is rotated intermittently step by step synchronously with but in an opposite direction to the feed turret 27, so that the half molds 28 are successively brought into alinement with the cylindrical molds 42. The mold-carrying turret 43 and the feed turret 27 are geared together for unitary rotation in opposite directions and synchronous periods of rest by means of similar spur gears 44 and 45. The gear 44 for the mold-carrying turret 43 is shown as connected thereto by means of an intermediate sleeve 46 which is shown as formed integral with the mold-carrying turret 43 and its gear 44; and the gear 45 is similarly connected to the feed turret 27 by means of a connecting sleeve 47. It is to be noted that the feed wheel escapement cam 24, hereinbefore described, is carried by the sleeve 47 which connects the feed turret 27 with its operating gear 45 and is shown as formed integral therewith, as most clearly appears in Figs. 11 and 17. The connecting sleeve 47 for the feed turret 27 and its operating gear 45 is journaled in the frame of the machine and surrounds the forward end of the longitudinal operating shaft 15 which is journaled therein, as clearly appears in the drawings, particularly in Figs. 11 and 17 thereof. The mold-carrying turret 43 and its operating gear 44, which, as above noted, are integrally connected by the sleeve 46, are mounted for rotation upon a longitudinally extending reciprocating plunger rod or plunger shaft 48 forming a part of a plunger-operating device or mechanism, as will hereinafter appear.

The means for driving or operating the turrets 27 and 43, the escapement cam 24, the rocking guide hopper 26 and the forming arm 35 will now be described. Fixed upon the longitudinal drive shaft 15 is an operating member 49 for operating the rock shaft 30 of the rocking guide hopper 26, for operating the rock sleeve 40 which actuates the forming arm 35, and also for operating the feed turret 27 and the mold-carrying turret 43 to impart intermittent step by step rotation to these synchronously operated coöperating turrets. The operating member or operating disk 49 is provided with two peripheral cam surfaces, one of which, that appearing at the right in Figs. 2, 11 and 17 and at the rear in Fig. 20, is adapted to operate the rock shaft 30 of the guide hopper 26 through the intermediary of a rocking arm or cam arm 50 fixed upon the shaft 30 and shown as provided with an anti-friction roller or cam roller 51, and the other cam face of the operating member 49, appearing at the left in Figs. 2, 11 and 17 and at the front in Fig. 20, is adapted to rock the sleeve 40 by means of a cam arm or rocking arm 52 provided with an anti-friction roller or cam roller 53.

The cam roller 51 for the hopper 26 is held against its operating cam on the operating member 49 by means of a coiled retractile spring 54, shown as anchored to the frame of the machine at the rear thereof and as connected to a projecting pin or arm 55 carried by the hopper-actuating rock shaft 30, as clearly appears in Figs. 2 and 20 of the drawings. In the machine illustrated in the drawings the arrangement is such that the spring 54 rocks the hopper 26 in a counter-clockwise direction as viewed in Figs. 3, 14 and 18, for scraping off or cutting off the excess amount of depolarizing material in the uppermost open-sided forming mold or half mold 28, the rocking hopper 26 being brought back to its guiding position, illustrated in these figures of the drawings, by the action of the hopper-operating cam hereinbefore described as formed upon the operating member 49. In this connection, in relation to the combined guide hopper and cut-off device 26, it is to be noted that this hopper at the lower and left side thereof, as appears most clearly in Fig. 18 of the drawings, is provided with an extended arcuate surface which when the hopper 26 is rocked in a counter-clockwise direction by the spring 54 to cut off or scrape off the excess of depolarizing material 1, will pass across the top of and close the open side of the uppermost charge-containing half mold 28, so as to retain the charge therein during the initial part of the next subsequent or next following rotative movement of the intermittently rotated feed turret 27, preferably the guide hopper 26 being thus actuated to cut off the excess material and close the open side of the half mold 28 before the feed turret 27 begins its rotative movement, and the machine illustrated in the drawings is thus arranged or timed.

The cam arm 52 having thereon the cam roller 53 is positively actuated in a counter-clockwise direction by the hereinbefore described cam surface formed on the operating member 49 for operating the forming arm 35 to insert the former 34 and compress to cylindrical form a charge of depolarizing material 1 in a half mold 28 which is then in proper position at a period of rest of the feed turret 27; and a coiled retractile spring 56, anchored to the upper part of the machine and shown as attached to a pin or stud 57, which projects from the boss of the cam arm 52, coöperates with the forming arm spring 36 in retracting the connected parts and in maintaining the cam roller 53 of the cam arm 52 in contact with its operating cam formed on the actuating member 49. The arrangement of the parts is such that the upper end of the forming arm 35 is, at each forming operation thereof, brought firmly up against the stop 41 with a slight but sufficient torsional strain upon the intermediate connecting parts, including the sleeve 40, for assuring that this result shall take place, so that the charge of depolarizing material in the half mold 28 will always be compressed to substantially true cylindrical form by the forming mold 34.

The means for imparting intermittent step by step rotation to the feed turret 27 and the mold-carrying turret 43 will now be described. The operating member 49 is provided, on the front side thereof, with a projecting stud or crank pin 58 having thereon an anti-friction roller 59. A turret-operating member 60 is shown as formed integral with the spur gear 44 of the mold-carrying turret 43 at the rear thereof and this turret-operating member 60, upon its rear face, is provided with four spaced right-angular lugs or projections between which radial grooves are formed for the reception of the roller 59 of the stud 58, as appears in the drawings, particularly in Figs. 2 and 20. As the operating member 49 is rotated by the longitudinal shaft 15 in a counter-clockwise direction as viewed in Figs. 3, 14, 15, 18 and 20 of the drawings, the roller 59 on the crank stud 58 will enter one of the radial grooves or spaces formed between the above mentioned lugs or projections on the operating member 60 and will impart a quarter turn or one-fourth of a rotation to the member 60 once during a part of each complete rotation of the operating member 49 and its shaft 15, as perhaps most clearly appears in Fig. 20 of the drawings. It will now be evident that the feed turret 27 and the mold-carrying turret 43 will each have imparted thereto intermittent quarter rotations synchronously in opposite directions once for each complete rotation of the longitudinal shaft 15 and operating member 49, such rotative movement being imparted during the time that the roller-carrying stud 58 is engaged between the projections or when it is in a groove of the turret-operating member 60, which in the machine illustrated in the drawings will be during about one-fourth of a rotation of the shaft 15 and disk 49. It will likewise be evident that these partial rotations of the turrets 27 and 43 will alternate with periods of rest during the time that the roller-carrying stud 58 is free from or not engaged in a radial groove of the turret-operating member 60; and in the construction illustrated in the drawings such periods of rest will be through or during about three-fourths of a rotation of the operating member 49 and its shaft 15, as will be apparent from the drawings, particularly Fig. 20.

Locking means now to be described are provided for holding the coöperating turrets 27 and 43 securely against any accidental rotative movement or displacement during their periods of rest and while the roller 59 of the stud 58 is disengaged from the turret-operating member 60. The forward faces or sides of the two similar turret-connecting or coupling gears 44 and 45 are shown as provided with four radial grooves, two of which, one in each of these gears, are adapted to come into adjacent alinement with each other at a position corresponding to each period of rest of the intermittently rotated turrets 27 and 43. A turret lock 61 is slidably mounted and guided in the frame of the machine, as appears in the drawings, particularly in Fig. 11, and is adapted to engage in adjacent alined lock-receiving notches in the gears 44 and 45. The turret lock 61 is operated by means of a bent turret lock connecting rod 62 which, at its forward end, is connected to the turret lock 61 and which, at its rear end, is connected to a sliding head 63 guided in the frame of the machine, as shown, and provided with a projecting anti-friction roller 64. The turret lock 61 is constantly pressed toward its engaging position by means of a coiled retractile spring 65 shown as attached to the turret lock connecting rod 62 and anchored to the rear part of the frame of the machine. At the proper time to permit the rotation of the turrets 27 and 43, the turret lock 61 is disengaged from the alined notches or grooves in the turret-connecting gears 44 and 45 by means of a cam or wiper 66 which is carried by the transverse main shaft 16 and which, at the proper time, comes into engagement with the anti-friction roller 64 on the sliding head 63 and pushes forward this head together with the bent connecting rod 62 and sliding turret lock 61, as perhaps most clearly appears in Figs. 9 and 10 of the drawings.

It will be noted that the feed wheel escapement cam 24 does not rotate continuously, but rotates intermittently, partaking of the intermittent step by step rotation of the feed turret 27. Such intermittent rotation, however, answers every purpose for the performance of the function of this cam 24. The arrangement of the four cam faces of the escapement cam 24 is such, as clearly appears in Fig. 15, that the escapement wheel 18 will be released for rotation of the feed wheel 3 at the beginning of each rotative movement of the feed turret 27, thereby bringing about the properly timed dropping of a charge of depolarizing material from a pocket of the feed wheel 3 immediately upon or just after the arrival of the next advancing half mold 28 at the uppermost position, in fact, preferably the charge should start to drop before the feed turret 27 has stopped.

An end thrust bearing is provided for the mold-carrying turret 43 and comprises a lower bracket part 67 shown as bolted to the lower part of the frame of the machine, and an upper substantially semi-circular band part 68 secured by means of clamp bolts as shown to the lower bearing part 67. A neck 69 which integrally connects the spur gear 44 of the mold-carrying turret 43 with the turret-actuating member 60 is encircled by the two half circular or semi-circular members 67 and 68 and is provided, as appears in Fig. 11, with a deep conical or tapered groove in which is closely seated correspondingly tapered inner parts of the members 67 and 68. In addition to its function of providing a thrust bearing for the mold-carrying turret 43 the thrust-receiving members 67 and 68 are gripped by their clamping bolts upon the neck 69 upon which they act as a brake for absorbing the momentum of the turrets 27 and 43 and the several parts carried thereby in their quick intermittent step by step quarter rotation, and in this way this braking effect of the thrust-receiving device serves to steady the running of the machine and to guard against possible breakage by reason of the sudden movement and quick stoppage of the parts thereof.

The means for successively pushing a cylindrically formed charge of depolarizing material 1 from a half mold 28 into one of the open-ended cylindrical compression molds 42 and initially compressing such charge of depolarizing material in the latter, axially perforating and further compressing the cylinder of depolarizing material in the mold, inserting an electrode rod in such perforation, and finally ejecting the completed electrode bobbin from the mold, all of these operations being performed during the successive periods of rest in the intermittent rotation of the mold-carrying turret 43, will now be described. The construction of the part of the machine now to be described resembles that described in my hereinbefore mentioned Patent No. 1,185,177.

The reciprocating plunger rod 48 upon which the mold-carrying turret 43 is mounted to rotate, as hereinbefore described, projects from the front end of the machine and is there provided with a bearing in the frame of the machine through which it slides, as appears in the drawings, and at its rear end the plunger rod 48 is shown as connected to a cross head 70 which is guided in the frame of the machine, as appears in the drawings. The cross head 70 and plunger rod 48 are continuously reciprocated by means of a connecting rod 71 and crank 72 on the main shaft 16.

At the rear of its outer bearing the reciprocating plunger shaft 48 rigidly carries a plunger-carrying collar or spider 73 shown as provided with four radial arms 74, 75, 76 and 77, arranged ninety degrees apart, and these arms carry plunger heads 78, 79, 80 and 81, respectively, of which the head 78 is a combined inserting and compression head, 79 a combined perforating and compression head, 80 a carbon-inserting head, and 81 an electrode-ejecting head. A lateral arm 82, fixed upon the forward end of the plunger shaft 48 in alinement with the spider arm 74 and combined inserting and compressing head 78, coöperates with this head 78, as will presently appear. The four circularly arranged heads or sleeves 78, 79, 80 and 81 carry respectively a combined loading and compressing plunger, a perforating plunger provided with a compressing sleeve, a carbon-inserting plunger, and an electrode-ejecting plunger, and these four plunger-carrying operating heads will now be described in the order above named, which is also the order of their operation upon the depolarizing material in each of the molds 42 as each of these molds is brought successively into alinement with the plungers at the periods of rest of the mold-carrying turret 43, all of the plungers operating at once, but each plunger performing its own operation different from that of the others and in a different mold.

A combined loading and compression tip or rod 83 is carried by a sleeve 84 which is slidable through the plunger-carrying sleeve or combined inserting and compressing head 78, which appears at the front in Fig. 2, at the right in Fig. 3, and in the lower part of Figs. 8 and 12. At its forward end, at the front of the head or sleeve 78, the slidable tip-carrying sleeve 84 has fixed thereon a flanged collar 85 which receives the rear end of a sliding shaft or plunger 86 which is slidable through an adjustable tension sleeve 87 adjustably carried by and shown as screw-threaded through the lateral arm 82. The joined sections or parts 83, 84, 85 and 86 form a combined inserting and compressing plunger. A thrust collar 88 is loosely mounted upon the sliding rod 86 at the rear of the longitudinally adjustable guide sleeve 87, and a coiled thrust spring 89 surrounds the rod 86 between this thrust collar 88 and the flanged collar 85, which is adapted to abut against the forward end of the head or sleeve 78, as shown in the drawings, particularly in Fig 12.

The timing of the machine is such, as will be evident from an inspection of the drawings, particularly by noting the position of the cam roller 53 of the cam arm 52 in its relation to its operating cam on the operating member 49, as most clearly appears in Fig. 20, that the former 34 carried by the forming arm 35 will be operated just in advance of the inserting and compressing operation of the plunger rod 83, to compress laterally a charge of depolarizing material 1 into cylindrical shape directly at the front of and in alinement with one of the open-ended cylindrical compression molds 42, as is indicated in Figs. 12 and 18 of the drawings.

As the reciprocating inserting and compressing plunger moves to the left as viewed in Fig. 1, and to the right as viewed in Figs. 2, 8 and 12 of the drawings, the free end of the plunger tip 83 will enter the half mold 28 which is in alinement therewith, passing between this mold 28 and the former 34, and will push the cylinder of depolarizing material 1 from between the half mold 28 and former 34 into the alined compression mold 42, initially compressing the depolarized material 1 into the mold 42 and filling this mold 42 with such initially compressed depolarizing material. In the position of the parts illustrated in the drawings and appearing most clearly in Fig. 12, the former 34 and the inserting and compressing tip 83 have not yet acted upon the depolarizing material 1 in the half mold 28. As the depolarizing material 1 in the half mold 28, which has first been compressed into cylindrical form by the forming mold 34, is pushed by the plunger tip 83 of the inserting and compressing plunger into the alined open-ended compression mold 42, it completely fills the latter and an excess or surplus portion of such depolarizing material 1 will remain in the half mold 28, thus assuring that the mold 42 will be filled with depolarizing material under a predetermined degree of compression as determined by the compressing spring 89, the tension of which may be regulated by means of the screw-threaded sleeve 87. As the turrets rotate, the excess of depolarizing material 1 is scraped from the mouth of the mold 42 by a scraper 35ª shown as conveniently mounted upon the forming arm 35 in the path of the initially compressed depolarizing material which projects from the mold 42 and as appears in Figs. 8, 11, 12, 14 and 18 of the drawings. When the depolarizing material 1 is pushed by the plunger tip 83 from the half mold 28 and inserted into the alined mold 42, it is compressed in the mold 42 against an imperforate inserter block 90, shown as formed integral with a part of the frame of the machine. This above described initial compression of the depolarizing material may be said to take place at the first period of rest of the mold-carrying turret 43.

At the second position of rest of the turret 43, the depolarizing material 1 which, at the first position of rest, has been pushed from the half mold 28 into the mold 42, is perforated and further and finally compressed by a combined perforating and compression device carried by the perforating head 79, these second operations being performed at the same time or simultaneously with a repetition of the first operation, but in a different mold 42, which, at the time and always, is the lowermost mold carried by the mold-carrying turret 43, and upon the depolarizing material in which the above described initial compressing function has already been performed to produce a cylinder 91 of such material as appears in the lower part of Fig. 13, this cylinder 91 of depolarizing material completely filling the mold 42, and the material of which is of a predetermined degree of compression as hereinbefore described, so that this lowermost compression mold 42 contains a substantially accurately measured or uniform quantity of depolarizing material forming the cylinder 91.

A perforating plunger 92, carrying at its rear free end a perforating tip 93, is adjustably fixed at its forward end, by means of a set screw or clamp screw 94, in an adjustable plunger-carrying abutment sleeve 95, shown as screw-threaded through a cap 96 fixed upon the forward end of the outer sleeve or combined perforating and compression head 79, as most clearly appears in Figs. 13 and 13ª of the drawings. A slidable sleeve 97 surrounds the perforating plunger 92 and is guided in the rear end of the outer sleeve or head 79. The rear projecting free end of the slidable sleeve 97 is provided with a tubular combined guard tip and compressing tip 98 which is adjustably secured in the end of the sleeve 97 and rigidly held therein by means of a clamping band 99. At its inner end the slidable sleeve 97 carries a thrust-receiving nut 100, between which and the inner end of the adjustable abutment sleeve 95 a coiled thrust spring 101, surrounding the perforating plunger 92, is interposed, the adjustable abutment sleeve 95 being shown as hollowed out for receiving therein the thrust spring 101. The thrust-receiving nut 100 is adapted to abut against the abutment sleeve 95 when the slidable sleeve 97 and the parts carried thereby yield backwardly in the outer sleeve or head 79 and upon or relatively to the perforating plunger 92 and its perforating tip 93. A compression block 102 forms a bottom for the lower compression mold 42 at the back thereof and is shown as formed integral with the frame of the machine and has a hole or bore therethrough for the reception of depolarizing material cut from the cylinder 91 by the perforating tip 93.

The slidable sleeve 97 together with the parts carried thereby, including the tubular tip 98, is limited as to its outward or rearward movement by an abutment member 103 which is longitudinally adjustable upon the sleeve or head 79 by means of a pair of screws or tap bolts 104 by which the abutment member 103 is adjustably secured to the head or sleeve 79, and the abutment member 103 is shown as provided with an inwardly projecting stud which passes through a slot in the outer sleeve or head 79 and also passes through a slot shown as provided for the purpose in the slidable sleeve 97 and forms an abutment for the slidable sleeve 97 at the rear of the thrust-receiving nut 100, as most clearly appears in Fig. 13ᵃ of the drawings. The rear or perforating end of the perforating tip 93 should not project beyond the end of the surrounding tubular tip 98, and in the drawings, particularly in Figs. 13 and 13ᵃ, these ends are shown as almost flush or even with each other. The adjustable abutment member 103 provides for adjusting these parts irrespective of the independent adjustment of the perforating plunger 92.

In the combined perforating and final compressing operation, when the plunger shaft 48 in its reciprocating movement moves the combined perforating and compressing head 79 toward the alined lowermost compression mold 42, the outer ends of the perforating tip 93 and tubular tip 98 will simultaneously engage or come into contact with the outer end of the cylinder 91 of depolarizing material and this cylinder 91 will be perforated by the positively moving perforating tip 93, but the surrounding tubular tip 98 will yield, compressing the spring 101. Near the completion of the perforating movement, the thrust-receiving nut 100 will abut against the inner end of the adjustable plunger-carrying abutment sleeve 95 and after this the cylinder 91 of depolarizing material will be positively further compressed, the slidable sleeve 97 and the parts carried thereby, including the tubular tip 98, then partaking of the movement of the outer sleeve or head 79 to effect such final compression of the cylinder 91 to a predetermined length thereof, according to the adjustment of the screw-threaded sleeve 95, the longitudinal dimension of the cylinder forming the depolarizing part of the bobbin or electrode being thus accurately determined. When the perforating plunger 92 and its perforating tip 93 are retracted, through the forward movement of the outer sleeve or head 79 by the reciprocating plunger shaft 48, the outer end of the spring-pressed tubular tip 98 of the sleeve 97 will continue to rest upon and to press upon the outer exposed end of the perforated cylinder and will thereby prevent the chipping or breaking of the perforated cylinder by reason of its adhering to or tendency to adhere to the perforating tip 93 of the perforating plunger 92, the free end of the tubular tip 98 of the spring-pressed sleeve 97 being thus held against the outer end of the perforated cylinder until the perforating tip 93 has been entirely withdrawn therefrom, as will be readily understood.

At the third position of rest of the step by step movement of the intermittently rotated mold-carrying turret 43, a carbon electrode rod or core 105 is inserted in a perforated cylinder 106 of depolarizing material contained in the mold 42, corresponding to this third position of rest and appearing at the front in Fig. 1, at the left in Fig. 3, at the top and left in Fig. 8, at the front in Fig. 9, and at the top in Fig. 12. The means for performing this third operation will now be described. A carbon-inserting plunger or push rod 107 is longitudinally adjustable, by means of an end screw 108 and clamp screw 109, in a sleeve 110 which is longitudinally adjustable in the outer sleeve or carbon-inserting head 80 by means of a clamp screw 111, as most clearly appears in Fig. 12.

A limited supply of carbon electrode rods or cores 105 is contained in and these rods or cores are fed downward by gravity through a vertically arranged carbon chute 112, one side of which is shown as entirely closed and the other side of which is shown as closed only by guide strips 113 which engage the ends of the carbon rods 105, which rest upon a chute bottom 114 (Fig. 9) with the lowermost of these rods in axial alinement with the perforated cylinder 106 in the mold 42 at this position. At each backward movement of the carbon-inserting head 80 in the reciprocation of the plunger shaft 48, the lowermost carbon electrode rod or core 105 will be pushed from the chute bottom 114 into the perforation of the axially alined perforated cylinder 106 of depolarizing material, this electrode rod 105 being guided by the chute bottom 114, which is preferably transversely of V-shape on its upper surface, and also being guided by the overlying carbon rods 105 which rest with their weight upon the lowermost rod which is to be inserted. An abutment block 115 shown as formed integral with the frame of the machine serves as a bottom for the mold 42 and holds the cylinder 106 in place while a carbon electrode rod or core 105 is inserted therein. In view of the fact that the carbon electrode rod 105 fits tightly in the perforation of the perforated cylinder 106 of depolarizing material, the advancing end of the carbon rod 105 will shave off a small quantity of the depolarizing material, and the abutment block 115 is therefore shown as provided with a hole or perforation therein for the reception or escape of this shaved off material, thereby permitting the insertion of the carbon rod entirely through the perforated cylinder 106.

The carbon-containing chute 112 is preferably kept nearly full of the carbon electrode rods or cores 105, as appears in Fig. 9, and automatically acting feed means now to be described are provided for replenishing the chute 112 with these rods. The carbon electrode rods or cores 105 are shown as stacked in a flat hopper or magazine 116 which is shown as partly open at the front end of the machine and as slightly inclined toward the rear end of the machine. The electrode rods or cores 105 are fed one by one from the bottom of the magazine 116 and dropped into the upper end of the chute 112 at the same rate that they are used therefrom, by a notched feed wheel 117 having therein longitudinally or axially thereof a circumferential series of carbon-receiving grooves each of which is adapted to receive a carbon rod 105 from the feed hopper or magazine 116 and drop it into the upper end of the chute 112 as the feed wheel 117 rotates, as will be readily understood. The feed wheel 117 is fixed upon and carried by the forward end of a rearwardly extending and downwardly inclined feed wheel shaft 118 which is journaled in a part of the frame of the machine. For driving the carbon feed shaft 118 a miter gear 119 is fixed upon the rear end of this shaft and is engaged by a similar miter gear 120 which is carried by a stud 121 which is supported by a part of the frame of the machine and extends transversely horizontally. A ratchet wheel 122 is fixed to the miter gear 120 and is operated by a rearwardly and upwardly extending bent cam arm 123 upon which is pivoted a ratchet-engaging pawl 124 pressed to the engaging position by a flat pawl spring 125, the cam lever 123 being pivoted upon the transverse gear-carrying supporting stud 121. Carbon-feeding movement is imparted to the cam lever 123 by means of a coiled retractile spring 126 attached to the upwardly and rearwardly projecting rear end thereof and anchored to the frame of the machine. The cam lever 123 is rocked or retracted in an upward direction by means of a bent upwardly and forwardly extending arm 127 carried by the cross-head 70 and shown as formed integral or in one piece therewith, the upper and forwardly projecting free end of the operating arm 127 being shown as provided with an anti-friction cam roller 128 upon which the inclined cam surface of the cam lever 123 rides by reason of the tension or pull of the operating spring 126, and the forward free end of the operating arm 127 is also provided with a pair of upstanding guide lugs 129 for guiding the lever 123 at its sides and holding it in place upon the cam roller 128.

The ratchet wheel 122 contains the same number of teeth as there are carbon-carrying grooves in the carbon-feeding wheel 117, and the cam surface of the bent cam lever 123 is so proportioned and arranged that the ratchet wheel 122 will be fed forward to the extent of one tooth for each complete rocking movement of the operating lever 123, and it will be evident that one such complete rocking movement will be imparted to the rocking lever 123 at each complete reciprocation or forward and back movement of the cross head 70 and that the carbon-feeding movement of the carbon wheel 117 will be imparted thereto by the spring 126 during the backward movement of the cross head 70, which, as hereinbefore noted, carries and operates the reciprocating plunger shaft 48. Thus it will be seen for each carbon used from the lower end of the feed chute 112 another is supplied or dropped into the upper end of the feed chute 112 by the intermittently rotated carbon feeding wheel 117.

The inner electrode or battery bobbin is complete in the mold 42 after the insertion of a carbon electrode rod 105 into the depolarizing cylinder 106 at the third position of rest of the turret 43, as above described. At the fourth position of rest of the turret 43 the completed bobbin or inner electrode is ejected from the mold 42 and delivered from the machine, this fourth operation, relative to the mold-carrying turret 43, taking place in the uppermost mold 42 therein and as appears in the drawings, particularly in Figs. 1, 2, 3, 8, 9 and 13 thereof. An ejecting plunger 130, shown as tubular and as enlarged at its projecting free end, is shown as fixed by means of a clamp bolt 131 in the rear end of the outer sleeve or ejecting head 81, which is shown as split. At its rear projecting free end the ejecting plunger 130 rigidly carries an ejector tip 132 which is firmly but adjustably held in place by means of a clamp screw 133. At its rear projecting free end the ejector tip 132 is provided with a carbon-receiving socket, as appears in Fig. 13 of the drawings, for freely receiving the projecting end of the carbon electrode rod 105, so that the electrode-ejecting thrust will be brought to bear only upon the cylinder 106 of depolarizing material and the carbon electrode rod 105 will not be displaced in such cylinder. It will now be evident that a completed electrode or bobbin will be ejected from the uppermost mold at each rearward movement of the reciprocating plunger shaft 48 at the uppermost and fourth position of rest of a mold 42 as it is carried around step by step by the mold-carrying turret 43. It will also be understood that the three preceding operations hereinbefore described will, at the same time, be performed in other molds 42 at the first, second and third positions thereof in the step by step movement of the turret 43, the different operations being performed successively in the same mold at different times and all of the four operations being performed at the same time in different molds at the four different locations.

As the completed electrode is ejected by the rearwardly moving ejector tip 132 from the uppermost mold 42, it is received upon the inclined bottom of a slightly downwardly inclined delivery chute 134 which extends toward the front side of the machine and is shown as having a bottom and only one side wall. The delivery chute 134 is provided with a pivoted gate 135 above which the electrode bobbins are delivered, as most clearly appears in Fig. 21, in which the closed position of this gate is indicated in broken lines. The gate 135 normally maintains the closed position by reason of gravity assisted by a retractile spring 136. The gate 135 holds the electrode bobbins straight until they are completely ejected from the mold 42 and assures that they shall roll evenly straight down the inclined delivery chute 134 to the lower end thereof, which they would not do should they start from the top at an oblique angle or should they turn lengthwise or partly so in the delivery chute, this being prevented by the gate 135, as will be readily understood. After an electrode bobbin is fully ejected from the uppermost mold 42, the gate 135 is then lifted to permit this bobbin to roll down and from the delivery chute 134. The bobbin-restraining gate 135 is thus lifted by means of a cam arm 137, shown as rigidly bolted to and projecting rearwardly from the ejector head or split outer sleeve 81, this cam arm 137 being provided at its outer free end with an inclined cam surface which, as the ejecting plunger is retracted by the forward movement of the reciprocating plunger shaft 48, engages with an upright pin or stud 138 carried by the gate 135, so that the gate 135 is rocked upon its pivot and lifted to release the electrode bobbin held thereby, the arrangement of the parts being such that the gate 135 is permitted to again close in time to receive the next succeeding electrode bobbin as it is ejected. The electrode bobbins, as they roll from the lower end of the delivery chute 134, are received in any suitable way, such, for example, as upon a soft netted surface from which they may be taken by hand and packed in trays to be carried away.

The automatic electrode-making machine of my invention is continuously driven and automatically performs all of its hereinbefore described operations without any manual operation being performed and entirely without need of attention, other than general supervision, the starting and stopping of the machine, the replenishing of the mass of depolarizing material 1 from time to time in the powder magazine 2 and of the carbon electrode rods 105 in the carbon magazine 116, and the taking away of the completed electrode bobbins.

Manually operated clutch mechanism for stopping and starting the machine is provided and will now be described. This clutch mechanism appears in Figs. 1, 2, 3 and 4 of the drawings and is more particularly illustrated in Figs. 5, 6 and 7 thereof. A pivoted pawl 139 is supported by a part of the frame of the machine beneath the main guide shaft or crank shaft 16 and controls a slidable clutch-disengaging wedge 140 and normally holds this wedge at its disengaged or non-operative position, the wedge 140 being pressed toward its operating position by a pair of coiled thrust springs 141, and the pawl 139 being pressed into engagement with a shoulder on the wedge 140 by a pawl spring 142, as most clearly appears in Fig. 5. A main drive pulley 143 is freely or loosely rotatively mounted upon the main drive shaft 16 between a boss 144 formed thereon and an outer collar 145 fixed upon the outer end of the drive shaft 16. The hub of the driving pulley 143 has therein a clutch-receiving recess, as appears in Fig. 5 of the drawings, and the boss 144 of the drive shaft 16 has an undercut or dove-tailed clutch-receiving groove longitudinally therein. A clutch member 146 is slidably mounted in the longitudinal groove of the boss 144, and a coiled thrust spring 147, shown as contained in a bore in the clutch member 146 and as acting against an abutment pin 148, as appears in Fig. 5, presses the slidable clutch member 146 toward the hub of the driving wheel 143 and into the clutch-receiving recess therein. The boss 144 of the drive shaft 16 is also provided with an annular groove which intersects but is of less depth than the longitudinal groove for the clutch member 146, as most clearly appears in Fig. 6. The slidable clutch member 146 on its outer side is notched transversely so as to provide an inclined shoulder, as shown more particularly in Fig. 7, which, when the clutch member 146 is in the engaged position, lies in the annular groove in the boss 144 in position to be engaged by the upper transversely wedge-shaped end of the clutch-releasing wedge 140 when the latter is in its uppermost position, but being free therefrom when the clutch-disengaging wedge 140 is withdrawn to its lower position, where it is held by the spring-pressed pawl 139, as clearly appears in Fig. 5 of the drawings.

A clutch-controlling lever arm 149, horizontally arranged, extends at its free end beneath the outer laterally projecting arm of the clutch-controlling pawl 139 and above a pin or stud 150 which rigidly projects from the slidable clutch-disengaging wedge 140, as most clearly appears in Fig. 5. When the free end of the clutch-controlling lever arm 149 is raised it will come in contact with and raise the outer arm of the clutch pawl 139 and disengage the clutch pawl 139 from the clutch-disengaging slide 140, whereupon the latter will be raised by its springs 141 to the clutch-releasing position with its upper wedge-shaped end in the path of the inclined shoulder of the slidable clutch member 146 and, by reason of its wedging or cam action, will withdraw the clutch member 146 from the recess in the hub of the driving wheel 143, thereby stopping the entire machine, the driving wheel 143 only continuing to rotate. If the free end of the horizontally extending lever arm 149 is lowered it will press upon the stud 150 and withdraw the slidable clutch-disengaging wedge 140, thereby permitting the slidable clutch member 146 to be moved to the engaging position by its thrust spring 147, and the pawl 139 will be pressed by its spring 142 into engagement with the shoulder of the clutch-operating wedge 140 to hold the latter in non-operative position. The rearwardly extending substantially horizontal clutch-operating lever arm 149 is fixed upon a transverse rock shaft 151 which is pivoted in the lower part of the frame of the machine and extends through from the front to the back of the machine. At its opposite ends the rock shaft 151 is provided with similar upstanding hand levers 152.

In conclusion it is to be noted that the operation of the machine has been hereinbefore described along with the description of its construction and there seems little to be added in this connection. It is to be noted that for each rotation of the main shaft 16 a complete cycle or series of operations of the machine takes place, a completed electrode bobbin being discharged or delivered from the machine for each rotation of the main shaft 16. The normal running capacity or output of the machine illustrated in the drawings is about ninety-four completed electrode bobbins per minute, amounting to between fifty and sixty thousand bobbins a day of ten hours. It is to be noted, as hereinbefore particularly described, that a plurality of the bobbin-making operations takes place at the same time at different places corresponding to different successive stages of the making of the bobbin. For example, to trace the operation backward through the machine and assuming that the completed electrode bobbin which is being ejected and delivered from the machine to be the first made by the machine and therefore number one, it will be noted that while the completed electrode bobbin number one is being ejected and the empty mold 42 moved forward from the fourth to the first position; bobbin number two, in the form of a perforated cylinder 106, is having an electrode rod 105 inserted therein and is moved forward from the third to the fourth position; bobbin number three is being longitudinally axially perforated and further compressed to a predetermined longitudinal dimension and is moved from the second to the third position; bobbin number four is laterally compressed into cylindrical form by the former 34 and this cylinder 91 thus formed is pushed from between the forming molds 28 and 34 into a compression mold 42 and is compressed therein to a predetermined degree of compression and then moved forward from the first to the second position; bobbin number five is roughly formed or shaped in the uppermost half mold or forming mold 28 and is moved into alinement with a mold 42 at the first position thereof; and bobbin number six is dropped from the notched feed wheel 3 into the next following half mold 28, in the form of an irregular mass of depolarizing material 1.

It is obvious that various modifications may be made in the construction shown in the drawings and above particularly described within the principle and scope of my invention.

I claim:

1. An electrode-making machine comprising a mold, an intermittent feed device operative to feed a charge of depolarizing material into alinement with the mold at the front thereof, and means for introducing and compressing the depolarizing material in the mold and axially perforating the compressed material in the mold and inserting an electrode rod in the perforation and ejecting the completed electrode from the mold.

2. An electrode-making machine comprising a mold, an intermittent feed device operative to feed successive charges of depolarizing material at intervals into alinement with the mold at the front thereof, means for introducing and compressing the charge of depolarizing material in the mold, means for axially perforating the compressed charge of material in the mold, means for inserting an electrode rod in the perforation, and means for ejecting the completed electrode from the mold.

3. An electrode-making machine comprising a mold, an intermittent feed device operative to feed successive charges of depolarizing material at intervals into alinement with the mold at the front thereof, a plunger for concurrently introducing and compressing the charge of depolarizing material in the mold, a perforating plunger for axially perforating the compressed charge of depolarizing material in the mold, an electrode-inserting plunger for inserting an electrode rod in such perforation, and an ejecting plunger for ejecting the completed electrode from the mold.

4. An electrode-making machine comprising a mold, an intermittent feed device operative to feed charges of depolarizing material at intervals into alinement with the mold at the front thereof, a yieldable plunger for concurrently introducing and compressing the charge of depolarizing material in the mold to fill the mold with such material at a predetermined degree of compression, means for scraping the excess of compressed material from the mouth of the mold, a perforating plunger for axially perforating the compressed material in the mold, an electrode-inserting plunger for inserting an electrode rod in such perforation, an ejecting plunger for ejecting the completed electrode from the mold, means for bringing the mold successively into register with the respective plungers in the order recited, a yieldable sleeve slidable backwardly upon the perforating plunger and pressing upon the material in the mold to prevent the breaking of the material by the withdrawal of the perforating plunger, and an abutment in the path of such sleeve as it moves backwardly so that in the final stage of making the perforation the sleeve will further positively compress the charge in the mold to a certain fixed predetermined dimension.

5. An electrode-making machine having, in combination, a mold, an intermittent feed device operative successively to feed charges of depolarizing material at intervals into alinement with the mold at the front thereof, a yieldable plunger for concurrently introducing and compressing the depolarizing material in the mold to fill the mold with such material under a certain predetermined degree of compression, means for scraping excess material from the mouth of the mold, a perforating plunger for axially perforating the compressed material in the mold, a yieldable sleeve slidable backwardly upon the perforating plunger to press upon and prevent the breaking of the material by the withdrawal of the perforating plunger, and an abutment in the path of the slidable sleeve for positively stopping its backward sliding movement so that such sleeve will positively compress the charge of depolarizing material in the mold to a certain predetermined dimension during the final stage of the making of the perforation by the perforating plunger.

6. An electrode-making machine comprising a plurality of circularly arranged molds, a mold-carrying turret upon which the molds are mounted, automatically acting means for imparting step by step rotation to the turret so that plungers may operate successively on the depolarizing material in the respective molds, a compressing plunger for compressing the depolarizing material in the molds, a perforating plunger for axially perforating the compressed material in the molds, an electrode-inserting plunger for inserting an electrode rod in such perforation, an ejecting plunger for ejecting the completed electrodes from the molds, and a reciprocating plunger-actuating part for operating all of the plungers at once.

7. An electrode-making machine comprising a plurality of circularly arranged molds, a mold-carrying turret upon which the molds are mounted, automatically acting means for imparting step by step rotation to the turret so that plungers may operate successively on the depolarizing material in the respective molds, a compressing plunger for compressing the depolarizing material in the molds, a perforating plunger for axially perforating the compressed material in the molds, an electrode-inserting plunger for inserting an electrode rod in such perforation, an ejecting plunger for ejecting the completed electrodes from the molds, a reciprocating plunger-actuating part for operating all of the plungers at once so that each plunger performs its own operation different from that of the other plungers, and an intermittent feed device operative to feed successive charges of depolarizing material at intervals to the successive molds carried by the turret and in alinement with the compressing plunger.

8. An electrode-making machine comprising a plurality of circularly arranged molds, a mold-carrying turret upon which the molds are mounted, means for imparting step by step rotation to the turret so that plungers may operate successively on the depolarizing material in the respective molds, a compressing plunger for compressing the depolarizing material in the molds, a perforating plunger for axially perforating the compressed material in the molds, an electrode-inserting plunger for inserting an electrode rod in such perforation, an ejecting plunger for ejecting the completed electrodes from the molds, a reciprocating plunger-actuating part for operating all of the plungers at once so that each plunger performs its own operation different from that of the other plungers, and an intermittent feed device operative to feed successive charges of depolarizing material to the successive molds carried by the turret and in alinement with the compressing plunger; such feed device including a feed turret rotative step by step and having periods of movement and periods of rest corresponding to and concurrent with the similar step by step movement of the mold-carrying turret, means for imparting such step by step rotation to the feed turret, and means for supplying depolarizing material to the feed turret.

9. An electrode-making machine having, in combination, a powder magazine for containing powdered depolarizing material, a peripherally notched feed wheel for delivering the depolarizing powder from the powder magazine, means for imparting step by step rotation to such feed wheel, a funnel-like hopper for guiding the charges of depolarizing powder as they are intermittently dropped by the feed wheel in its step by step rotation, a peripherally notched feed turret for receiving from the hopper a charge of depolarizing powder in each of its peripheral notches, means for imparting step by step rotation to the feed turret, a mold with which the charges of depolarizing powder are successively brought into alinement by means of the intermittently rotated feed turret, means for pushing the depolarizing powdered material into the mold and compressing it therein, means for axially perforating the compressed material in the mold, means for inserting an electrode rod in the perforation, and means for ejecting the completed electrode from the mold.

10. An electrode-making machine having, in combination, a powder magazine for containing powdered depolarizing material, a peripherally notched feed wheel for delivering the depolarizing powder from the powder magazine, means for imparting step by step rotation to such feed wheel, a funnel-like hopper for guiding the charges of depolarizing powder as they are intermittently dropped by the feed wheel in its step by step rotation, a peripherally notched feed turret for receiving from the hopper a charge of depolarizing powder in each of its peripheral notches, a mold-carrying turret having a plurality of molds corresponding in number to the number of peripheral charge-carrying notches of the feed turret, means for imparting synchronous step by step rotation to the feed turret and the mold-carrying turret for successively bringing charges of powdered depolarizing material into alinement with the molds carried by the mold-carrying turret, a compressing plunger for pushing the depolarizing material into a mold and compressing it therein, a perforating plunger for axially perforating the compressed material in the mold, an electrode-inserting plunger for inserting an electrode rod in such perforation, an ejecting plunger for ejecting the completed electrode from the mold, and a reciprocating plunger-carrying part for operating all of the plungers at once as the molds are successively brought into alinement with the plungers and during the successive periods of rest of the intermittently rotated mold-carrying turret so that each plunger performs its own operation different from that of the other plungers.

11. An electrode-making machine having, in combination, a powder magazine for containing powdered depolarizing material, a peripherally notched feed wheel adapted to deliver charges of depolarizing material from the magazine in excess of the required amount for each charge, means for imparting step by step powder-feeding rotation to the feed wheel, a funnel-like hopper for guiding the excess charges of depolarizing material as they drop downward from the feed wheel, a peripherally notched feed turret into which the successive charges are adapted to drop from the hopper in excess of the amount of such material required to fill the feed turret notches, such notches also being adapted to contain an excess amount of the depolarizing material dropped from the feed wheel, means for periodically rocking the guide hopper for scraping off the excess of depolarizing material which projects beyond the peripheral notches of the feed turret, means for imparting intermittent rotation to the feed turret, a mold with which the charges of depolarizing material carried by the feed turret are adapted to be brought into alinement, a yieldable compression plunger for pushing a predetermined amount of the excess charge into the mold under a predetermined degree of compression and leaving an excess portion of such charge projecting from the mold, and a scraper for removing such projecting excess material.

12. An electrode-making machine having, in combination, a powder magazine for containing powdered depolarizing material, a peripherally notched feed wheel adapted to deliver charges of depolarizing material from the magazine in excess of the required amount for each charge, means for imparting step by step rotation to the feed turret, the powder-receiving notches in the feed turret having circularly arcuate bottoms, a former having a correspondingly circular concavely arcuate face for compressing the depolarizing material in the notches into cylindrical form, means for intermittently actuating the former for effecting such compression during successive periods of rest of the feed turret, a mold with which such charges are adapted to be brought into alinement at such point of compression, a yieldable compression plunger for pushing a predetermined amount of the excess charge into the mold under a predetermined degree of compression and leaving an excess portion of such charge projecting from the mold, and a scraper for removing the excess material which projects from the mold.

13. An electrode-making machine comprising a mold, a compressing plunger for compressing depolarizing material in the mold, a perforating plunger for axially perforating the compressed material in the mold, an electrode-inserting plunger for inserting an electrode rod in such perforation, an ejecting plunger for ejecting the completed electrode from the mold, means for relatively shifting the mold and the plungers for bringing the mold and the plungers into register in the successive order of the plungers recited, a rod-containing hopper for the electrode rods, means for feeding the electrode rods from the hopper one by one, and a chute adapted to contain a series of the electrode rods fed from the hopper with the lowermost rod in alinement with the electrode-inserting plunger so as to be pushed thereby into the perforation in the depolarizing material.

14. An electrode-making machine comprising a mold, a compressing plunger for compressing depolarizing material in the mold, a perforating plunger for axially perforating the compressed material in the mold, an electrode-inserting plunger for inserting an electrode rod in such perforation, an ejecting plunger for ejecting the completed electrode from the mold, means for relatively shifting the mold and the plungers for bringing the mold and the plungers into register in the successive order of the plungers recited, a rod-containing hopper for the electrode rods, a feed wheel having therein a series of peripheral rod-receiving grooves, means for rotating the fed wheel to feed the electrode rods from the hopper one at a time, for each operation of the electrode inserting plunger, and a chute adapted to contain a series of the electrode-rods fed from the hopper with the lowermost rod in alinement with the electrode-inserting plunger so as to be pushed thereby into the perforation in the depolarizing material.

15. In apparatus of the character designated, in combination, a carrier disk formed with a plurality of equidistant blank receivers, means for automatically rotating said carrier disk intermittently, means for automatically compressing and molding a moistened charge of comminuted material into prescribed form, means for automatically introducing said molded blank into one of the receivers in said carrier disk, means for automatically piercing said molded blank, and means for automatically discharging the same from its holder.

16. In apparatus of the character designated, in combination, a carrier disk formed with a plurality of equidistant blank receivers, means for automatically rotating said carrier disk intermittently, means for automatically compressing and molding a moistened charge of comminuted material into prescribed form, means for automatically introducing said molded blank into one of the receivers in said carrier disk, means for automatically piercing said molded blank, means for automatically introducing a core into said pierced blank, and means for automatically discharging the finished blank from its holder.

17. In apparatus of the character designated, in combination, an intermittently rotatable carrier and transfer disk formed with a plurality of blank receivers, a reciprocatory cross head carrying a plurality of punches in alinement with the receivers in said transfer disk when the latter is at rest, and means for automatically compressing and molding a moist charge of comminuted material and introducing it into one of the receivers in said transfer disk.

18. In apparatus of the character designated, in combination, an intermittently rotatable carrier and transfer disk formed with a plurality of blank receivers, a reciprocatory cross head carrying a plurality of punches in alinement with the receivers in said transfer disk when the latter is at rest, means for automatically compressing and molding a moist charge of comminuted material and introducing it into one of the receivers in said transfer disk, and means for automatically locking said transfer disk in position during the work stroke of said reciprocatory cross head and punches, for the purpose described.

19. In apparatus of the character designated, in combination, an intermittently rotatable carrier and transfer disk formed with a plurality of equidistant blank receivers, means for automaticaly and laterally compressing and molding a moist charge of comminuted material and introducing it into one of the receivers in said transfer disk, means for automatically piercing said blank, and means for automatically introducing a core into said piercing blank.

20. In apparatus of the character designated, in combination, an intermittently rotatable carrier and transfer disk formed with a plurality of equidistant blank receivers, means for automatically and laterally compressing and molding a moist charge of comminuted material and introducing it into one of the receivers in said transfer disk, means for automatically piercing the blank, means for automatically introducing a core into said blank, and means for automatically feeding the cores to said core-introducing means.

21. In apparatus of the character designated, in combination, an intermittently rotatable carrier and transfer disk formed with a plurality of equidistant blank receivers, means for automatically and laterally compressing and molding a moist charge of comminuted material and introducing it into one of the receivers in said transfer disk, and means for automatically feeding prescribed charges of said moistened comminuted material to said compressing and molding means.

22. In apparatus of the character designated, in combination, an intermittently rotatable carrier and transfer disk formed with a plurality of equidistant blank receivers, means for automatically and laterally compressing and molding a moist charge of comminuted material and introducing it into one of the receivers in said transfer disk, means for automatically piercing said blank, means for automatically introducing a core into said pierced blank, and means for adjusting the extent of thrust of said core-introducing means.

23. In apparatus of the character designated, in combination, a carrier disk formed with a plurality of receivers, means for automatically rotating said carrier disk intermittently, means for automatically molding a charge of depolarizing material into prescribed form, means for automatically introducing said molded charge into one of the receivers in said carrier disk, means for automatically introducing an electrode rod into said molded charge and means for automatically discharging the finished product from its receiver.

24. In apparatus of the character designated, in combination, an intermittently rotatable carrier and transfer disk formed with a plurality of receivers, means for automatically molding a charge of depolarizing material and introducing it into one of the receivers in said transfer disk, and means for automatically introducing an electrode rod into said molded charge.

25. In apparatus of the character designated, in combination, an intermittently rotatable carrier and transfer disk formed with a plurality of receivers, means for automatically molding a charge of depolarizing material and introducing it into one of the receivers in said transfer disk, means for automatically introducing an electrode rod into said molded charge, and means for automatically feeding the electrode rods to said rod-introducing means.

26. An electrode-making machine comprising a mold, a feed device operative automatically to feed a charge of depolarizing material into alinement with the mold at the front thereof, and means for introducing the depolarizing material into the mold and inserting an electrode rod in the material and ejecting the completed electrode from the mold.

27. An electrode-making machine comprising a mold, an intermittent feed device operative automatically to feed successive charges of depolarizing material at intervals into alinement with the mold at the front thereof, means for introducing the charge of depolarizing material into the mold, means for inserting an electrode rod in the material forming the charge, and means for ejecting the completed electrode from the mold.

28. An electrode-making machine comprising a mold, an intermittent feed device operative automatically to feed successive charges of depolarizing material at intervals into alinement with the mold at the front thereof, a plunger for introducing the charge of depolarizing material into the mold, an electrode-inserting plunger for inserting an electrode rod in such material, and an ejecting plunger for ejecting the completed electrode from the mold.

29. An electrode-making machine comprising a turret having a plurality of circularly arranged molds, automatically acting means for imparting step by step rotation to the turret so that plungers may operate successively on the depolarizing material in the respective molds, a plunger for introducing the depolarizing material into the molds, an electrode-inserting plunger for inserting an electrode rod in such material, an ejecting plunger for ejecting the completed electrodes from the molds, and a reciprocating plunger-actuating part for operating all of the plungers at once.

30. An electrode-making machine having, in combination, a mold, an automatically acting electrode-inserting plunger for inserting an electrode rod into the mold, a rod containing hopper for the electrode rods, means for automatically feeding the electrode rods from the hopper one by one, and a chute adapted to contain a series of the electrode rods fed from the hopper with the lowermost rod in alinement with the electrode-inserting plunger so as to be pushed thereby into the mold.

31. An electrode-making machine comprising a mold, means for automatically supplying a charge of depolarizing material to the mold, and means for forming the depolarizing material in the mold and inserting an electrode rod in the material and ejecting the completed electrode from the mold.

32. An electrode-making machine comprising a mold, means for automatically supplying a charge of depolarizing material to the mold and for forming the depolarizing material in the mold in the form of a tube, means for inserting an electrode rod in the tube, and means for ejecting the completed electrode from the mold.

33. An electrode-making machine having, in combination, a mold-carrying turret including a plurality of circularly arranged molds, automatically acting means for imparting step by step rotation to the turret, means for automatically supplying successive charges of depolarizing material to the successive molds carried by the turret, means for forming the depolarizing material in the mold in a prescribed form, means for inserting an electrode rod in the material, and means for ejecting the completed electrode from the mold.

34. An electrode-making machine having, in combination, a mold, means for automatically molding a charge of depolarizing material into prescribed form, means for automatically introducing said molded charge into the mold, means for automatically perforating said molded charge, and means for automatically discharging the same from the mold.

35. An electrode-making machine comprising means for automatically supplying a charge of depolarizing material to be operated upon, means for automatically forming said charge into a tube, means for automatically inserting an electrode rod into the tube, and means for automatically ejecting the completed electrode from the machine.

36. An electrode-making machine having, in combination, a mold, means for automatically introducing a charge of depolarizing material into the mold, means for automatically inserting an electrode rod in the depolarizing mass, and means for automatically discharging the same from the mold.

37. In apparatus of the character designated, in combination, a transfer disk formed with a plurality of equidistant blank receivers, means for automatically rotating said transfer disk intermittently, means for automatically and laterally compressing and molding a moist charge of comminuted material into prescribed form, means for automatically introducing the molded blank thus produced into one of the receivers on said transfer disk, means for then subjecting said blank to endwise pressure, and means for automatically discharging the compressed blank from the transfer disk at a subsequent partial rotation of the transfer disk.

38. An electrode-making machine having, in combination, a mold, an intermittent feed device operative automatically successively to feed charges of depolarizing material at intervals into alinement with the mold at the front thereof, a plunger for automatically introducing the charge into the mold and compressing it therein, a perforating plunger for automatically axially perforating the compressed material in the mold, a yieldable sleeve slidable backwardly upon the perforating plunger to press upon and prevent the breaking of the material by the withdrawal of the perforating plunger, and an abutment in the path of the slidable sleeve for stopping its backward sliding movement so that such sleeve will further compress the charge of depolarizing material in the mold to a certain predetermined dimension.

39. An electrode-making machine having, in combination, a mold, an intermittent feed device operative automatically successively to feed charges of depolarizing material at intervals into alinement with the mold at the front thereof, a plunger for automatically introducing the charge into the mold and compressing it therein, and a plunger for automatically perforating the charge in the mold and provided with a shoulder for further compressing the charge in the mold.

40. An electrode-making machine having, in combination, a mold, a feed device operative automatically to feed charges of depolarizing material to the mold, and an automatically acting plunger for perforating the charge of depolarizing material and provided with a shoulder for compressing the perforated charge of depolarizing material in the mold.

41. An electrode-making machine having, in combination, a mold, a feed device operative automatically to feed charges of depolarizing material to the mold, and an automatically acting plunger for forming each of said charges into a tube and provided with a shoulder for compressing the tubular charge of depolarizing material in the mold.

42. An electrode-making machine having, in combination, means for automatically molding a charge of depolarizing material, and means for automatically supplying charges of depolarizing material to said molding means, such charge-supplying means comprising a magazine for the depolarizing material, a peripherally notched feed wheel for delivering successive charges of depolarizing material from the magazine, and means for imparting step by step rotation to the feed wheel and including means for imparting a charge-releasing jar to the feed wheel at the completion of each of its step by step rotative movements.

43. An electrode-making machine having, in combination, means for automatically molding a charge of depolarizing material, and means for automatically supplying charges of depolarizing material to said molding means, such charge-supplying means comprising a magazine for the depolarizing material, a peripherally notched feed wheel for delivering successive charges of depolarizing material from the magazine, means for imparting a continuous torque impulse to the feed wheel, and an escapement device for permitting intermittent rotation of the feed wheel and whereby a charge-dislodging jolt is imparted to the feed wheel at the completion of each intermittent rotative movement thereof.

In testimony whereof I have affixed my signature.

SECONDO LOUIS CASELLA.